US012807203B2

(12) United States Patent
Elden

(10) Patent No.: US 12,807,203 B2
(45) **Date of Patent: *Nov. 24, 2026**

(54) COLLAPSIBLE CONTAINERS

(71) Applicant: dbest products, Inc., Carson, CA (US)

(72) Inventor: Richard Elden, Manhattan Beach, CA (US)

(73) Assignee: dbest products Inc., Carson, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/535,767

(22) Filed: Feb. 10, 2026

(65) Prior Publication Data

US 2026/0208780 A1 Jul. 23, 2026

Related U.S. Application Data

(63) Continuation of application No. 18/161,677, filed on Jan. 30, 2023, which is a continuation-in-part of (Continued)

(51) Int. Cl.
*B62B 3/02* (2006.01)

(52) U.S. Cl.
CPC .................................... *B62B 3/025* (2013.01)

(58) Field of Classification Search
CPC ......... B62B 3/025; B62B 3/027; B62B 3/022; B62B 3/02; B62B 5/02; B62B 5/026; B62B 5/028
See application file for complete search history.

(56) References Cited

U.S. PATENT DOCUMENTS 1,554,034 A 9/1925 Richie
2,132,069 A 10/1938 Hall
(Continued)

FOREIGN PATENT DOCUMENTS

CN 303947734 11/2016
CN 206813544 U 12/2017
(Continued)

OTHER PUBLICATIONS

U.S. Appl. No. 62/995,375, filed Jan. 27, 2020, Elden, Richard.
(Continued)

*Primary Examiner* — John D Walters
(74) *Attorney, Agent, or Firm* — ORBIT IP, LLP

(57) ABSTRACT

A collapsible cart includes a front and rear wall, a right and left sidewall and a pivotable base panel forming a compartment. For storage, the base panel can be folded upwards while the right and left sidewalls are folded inwardly. A rigid cover panel is conforming in shape to a top opening of the compartment and configured to securely fit in a first position over the top opening to serve as a cover and/or seat. The rigid cover panel is movably attached to a top of the front wall and is configured to be moved to a second position residing adjacent the front wall outside the compartment. A retractable handle mechanism is disposed at, within or adjacent the back wall. The retractable handle mechanism includes a hand grip attached to a telescoping assembly. The telescoping assembly is pivotably attached at a proximal end to the bottom of the rear wall.

20 Claims, 29 Drawing Sheets

Related U.S. Application Data application No. 17/712,032, filed on Apr. 1, 2022, now Pat. No. 11,565,735, which is a continuation of application No. 17/143,116, filed on Jan. 6, 2021, now Pat. No. 11,338,835.

(60) Provisional application No. 62/974,956, filed on Jan. 6, 2020, provisional application No. 62/995,375, filed on Jan. 27, 2020.

(56) References Cited

U.S. PATENT DOCUMENTS 2,362,721 A 11/1944 Reynolds
2,514,849 A 7/1950 Dewing
2,564,939 A 8/1951 Weast
2,715,533 A 8/1955 Strausburg
2,742,973 A 4/1956 Ingolf
2,757,935 A 8/1956 Sofia
2,786,692 A 3/1957 Jackson
2,957,700 A 10/1960 Beaurline
3,041,026 A 6/1962 Wilson
3,092,395 A 6/1963 Sol et al.
3,135,527 A 6/1964 Knapp
3,276,786 A 10/1966 Ward
3,804,432 A 4/1974 Lehrman
3,981,410 A 9/1976 Schurch
4,158,421 A 6/1979 Chi
4,202,521 A 5/1980 Harding
4,205,413 A * 6/1980 Collignon ............ A61G 1/0243 16/35 D
4,509,461 A 4/1985 Peck
4,662,532 A 5/1987 Anderson et al.
D292,135 S 9/1987 Grube et al.
4,765,644 A 8/1988 Bell
4,765,646 A 8/1988 Cheng
4,852,520 A 8/1989 Goetz
4,887,837 A 12/1989 Bonewicz, Jr. et al.
4,977,857 A 12/1990 Slawinski
5,168,601 A 12/1992 Liu
5,197,754 A 3/1993 Ward
5,244,219 A 9/1993 Hadlum
5,289,933 A 3/1994 Streich et al.
5,294,158 A 3/1994 Cheng
D352,145 S 11/1994 Perez
5,598,898 A 2/1997 Mutoh et al.
5,603,573 A 2/1997 Mercier et al.
5,651,791 A 7/1997 Zavlodaver et al.
5,653,194 A 8/1997 Guy
5,660,476 A 8/1997 DeCoster
5,678,842 A 10/1997 Hook et al.
5,765,665 A 6/1998 Cheng et al.
5,884,982 A 3/1999 Yemini
5,918,474 A 7/1999 Khanpara et al.
5,988,671 A 11/1999 Abelbeck et al.
6,021,740 A 2/2000 Martz
6,076,485 A 6/2000 Peeples et al.
6,126,183 A 10/2000 Lensing
6,131,941 A 10/2000 Huang et al.
6,138,851 A 10/2000 Townson
6,431,580 B1 8/2002 Kady
6,439,414 B1 8/2002 Liu
6,561,524 B1 5/2003 Medina
6,598,898 B2 7/2003 Chu
D477,916 S 8/2003 Nykoluk
6,601,859 B2 8/2003 Durham
6,626,634 B2 9/2003 Hwang et al.
6,651,791 B1 11/2003 Nykoluk et al.
6,688,516 B1 2/2004 Ussen
6,918,474 B2 7/2005 Nykoluk
7,066,476 B2 6/2006 Elden
D525,758 S 7/2006 Lynch
7,140,635 B2 11/2006 Johnson et al.
7,147,243 B2 * 12/2006 Kady ................... A45C 7/0045 280/655
D545,025 S 6/2007 Elden
7,270,223 B2 9/2007 Miller
7,281,637 B2 10/2007 Hadar
7,316,407 B1 1/2008 Elden
D565,269 S 3/2008 Tomasiak et al.
7,458,451 B2 12/2008 Godshaw et al.
7,516,502 B1 4/2009 Larson et al.
7,600,618 B2 10/2009 Fenton et al.
7,617,797 B2 11/2009 Lam
7,631,575 B2 12/2009 Gard et al.
7,699,212 B2 4/2010 Turvey et al.
7,731,221 B2 6/2010 Bess
7,766,367 B2 8/2010 Dotsey et al.
7,789,044 B2 9/2010 McGrade
7,914,015 B2 3/2011 Tompkins
D642,764 S 8/2011 Elden
8,317,219 B2 11/2012 Bruce
8,366,124 B1 2/2013 Caldwell
8,439,374 B1 5/2013 Elden
8,453,771 B1 6/2013 Hirschfeld
D690,893 S 10/2013 O'Brien
8,579,305 B2 * 11/2013 Hou ..................... A01K 1/0245 280/655
8,641,059 B2 * 2/2014 Khodor ..................... B62B 1/12 280/47.28
8,757,412 B2 6/2014 Sommer et al.
8,915,504 B1 12/2014 Seibert
D723,237 S 2/2015 Maddux et al.
9,233,700 B1 1/2016 Elden
9,278,775 B2 3/2016 Meers et al.
9,382,035 B2 * 7/2016 Fritz .................. B65D 21/0213
9,392,766 B1 * 7/2016 Elden .................. A01K 1/0035
9,796,402 B1 10/2017 Suarez
10,232,867 B1 3/2019 Jones et al.
10,246,115 B2 4/2019 Ryan
10,315,801 B2 6/2019 Molander
10,588,388 B2 3/2020 Kabalin
10,676,235 B1 * 6/2020 Song .................. B65D 11/1873
D904,716 S 12/2020 Shen
D906,229 S 12/2020 Han
D930,314 S 9/2021 Huang
D932,186 S 10/2021 Brunner et al.
11,191,332 B2 12/2021 Zemiro
D942,107 S 1/2022 Ren
11,338,835 B2 5/2022 Elden
D975,953 S 1/2023 Cohen et al.
11,565,735 B2 1/2023 Elden
D984,077 S 4/2023 Elden
D985,225 S 5/2023 Elden
D1,000,833 S 10/2023 Song
11,912,326 B2 2/2024 Elden
12,103,576 B2 10/2024 Elden
D1,056,616 S 1/2025 Dai
12,202,532 B2 1/2025 Elden
D1,069,309 S 4/2025 Elden
12,275,446 B2 4/2025 Elden
12,291,254 B2 5/2025 Elden
12,291,255 B2 5/2025 Elden
12,304,546 B1 5/2025 Elden
2002/0050429 A1 5/2002 Nykoluk et al.
2002/0089134 A1 7/2002 Salzberger et al.
2002/0139628 A1 10/2002 Chang
2002/0144874 A1 10/2002 Nykoluk et al.
2002/0158446 A1 10/2002 Stravitz et al.
2002/0171228 A1 11/2002 Kady
2003/0011173 A1 * 1/2003 Shall ...................... A01K 97/22 280/639
2004/0020008 A1 2/2004 Harris et al.
2004/0075248 A1 4/2004 Elden
2004/0211635 A1 10/2004 Lu
2005/0275195 A1 12/2005 Matula et al.
2006/0278173 A1 12/2006 Kamijo
2007/0215425 A1 9/2007 Slater
2008/0203044 A1 8/2008 Elden
2008/0238011 A1 10/2008 Hammel et al.
2009/0145913 A1 * 6/2009 Panosian ................... B62B 1/12 220/666
2009/0205578 A1 8/2009 Alves
2009/0212536 A1 8/2009 Tadeo

(56) References Cited

U.S. PATENT DOCUMENTS

| | | | | |
|---|---|---|---|---|
| 2010/0026080 | A1* | 2/2010 | Colchiesqui | B62B 5/026 301/5.23 |
| 2010/0175633 | A1 | 7/2010 | Krauss et al. | |
| 2011/0056441 | A1 | 3/2011 | Chang | |
| 2011/0084069 | A1 | 4/2011 | Hay | |
| 2011/0180533 | A1 | 7/2011 | Hay et al. | |
| 2011/0197823 | A1 | 8/2011 | Pietra | |
| 2012/0055122 | A1 | 3/2012 | Beauchamp | |
| 2012/0274052 | A1 | 11/2012 | Zhu | |
| 2013/0257009 | A1 | 10/2013 | Rogers | |
| 2013/0320641 | A1 | 12/2013 | Zhang | |
| 2015/0041420 | A1 | 2/2015 | Zelek et al. | |
| 2015/0076143 | A1 | 3/2015 | Ryan | |
| 2015/0225004 | A1 | 8/2015 | Dunford | |
| 2015/0360710 | A1 | 12/2015 | Thompson | |
| 2017/0001654 | A1* | 1/2017 | Obrien | B62B 1/14 |
| 2017/0120679 | A1 | 5/2017 | Naiva | |
| 2017/0297601 | A1 | 10/2017 | Carbonaro | |
| 2018/0014502 | A1 | 1/2018 | O'Shaughnessy | |
| 2019/0090602 | A1 | 3/2019 | Wathne | |
| 2019/0216193 | A1 | 7/2019 | Kabalin | |
| 2019/0270545 | A1 | 9/2019 | Apps et al. | |
| 2019/0289970 | A1 | 9/2019 | McGuire et al. | |
| 2019/0322302 | A1* | 10/2019 | Greenup | B62B 1/002 |
| 2019/0352050 | A1 | 11/2019 | Ismert | |
| 2020/0269898 | A1 | 8/2020 | Frankel et al. | |
| 2021/0206414 | A1 | 7/2021 | Elden | |
| 2024/0001979 | A1 | 1/2024 | Elden | |
| 2024/0132133 | A1 | 4/2024 | Elden | |
| 2024/0326885 | A1 | 10/2024 | Elden | |
| 2024/0351625 | A1 | 10/2024 | Elden | |
| 2025/0187642 | A1 | 6/2025 | Elden | |
| 2025/0236326 | A1 | 7/2025 | Elden | |

FOREIGN PATENT DOCUMENTS

| | | | | |
|---|---|---|---|---|
| CN | 107668883 | A | | 2/2018 |
| CN | 207120985 | U | | 3/2018 |
| CN | 207191693 | U | | 4/2018 |
| CN | 304632396 | | | 5/2018 |
| CN | 207506081 | U | | 6/2018 |
| CN | 108328065 | A | | 7/2018 |
| CN | 207809426 | | | 9/2018 |
| CN | 207809426 | U | * | 9/2018 |
| CN | 208070260 | U | | 11/2018 |
| CN | 304926177 | S | | 12/2018 |
| CN | 305015819 | S | | 1/2019 |
| CN | 208915679 | | | 5/2019 |
| CN | 209177176 | U | | 7/2019 |
| CN | 210083268 | | | 2/2020 |
| CN | 111003035 | | | 4/2020 |
| CN | 210747711 | U | | 6/2020 |
| CN | 112918890 | A | | 6/2021 |
| CN | 214777508 | U | | 11/2021 |
| CN | 214987121 | | | 12/2021 |
| CN | 214987334 | U | | 12/2021 |
| CN | 215555681 | | | 1/2022 |
| CN | 216995354 | | | 7/2022 |
| DE | 9203114 | U1 | | 5/1992 |
| DE | 202020102798 | U1 | | 5/2020 |
| EP | 3318465 | A1 | | 5/2018 |
| FI | 128389 | B | | 4/2020 |
| GB | 2243198 | A | | 10/1991 |
| GB | 2349186 | A | | 10/2000 |
| KR | 101996188 | | | 7/2019 |
| TW | M576553 | | | 4/2019 |
| TW | M631749 | | | 9/2022 |
| WO | 9632333 | | | 10/1996 |

OTHER PUBLICATIONS

U.S. Appl. No. 62/974,956, filed Jan. 6, 2020, Elden, Richard.
U.S. Appl. No. 63/551,851, filed Feb. 9, 2024, Elden, Richard.
U.S. Appl. No. 63/576,750, filed Mar. 6, 2023, Elden, Richard.
U.S. Appl. No. 63/577,068, filed Mar. 28, 2023, Elden, Richard.
U.S. Appl. No. 63/633,163, filed Apr, 12, 2024, Elden, Richard.
U.S. Appl. No. 63/628,273, filed Jul. 7, 2023, Elden, Richard.
U.S. Appl. No. 63/642,331, filed May 3, 2024, Elden, Richard.
U.S. Appl. No. 63/642,354, filed May 3, 2024, Elden, Richard.
U.S. Appl. No. 63/659,889, filed Jun. 14, 2024, Elden, Richard.
U.S. Appl. No. 19/190,489, filed Apr. 25, 2025, Elden, Richard.
Central District Court of California 2:25-cv-4573, Document 56, Order Denying Motion for Preliminary Injunction, dated Sep. 15, 2025, in 18 pages.
Central District Court of California 2:25-cv-4573, Document 57, Answer to First Amended Counterclaim, dated Sep. 18, 2025, in 10 pages.
Central District Court of California 2:25-cv-4573, Document 32, Order Denying Ex Parte Application to Shorten Time for Hearing on Preliminary Injunction Motion, dated Aug. 5, 2025, in 2 pages.
Central District Court of California 2:25-cv-4573, Document 38, First Amended Counterclaim, dated Aug. 21, 2025, in 31 pages.
Central District Court of California 2:25-cv-4573, Document 47, Ex Parte Application for Order Striking Untimely Reply Evidence, Theories, and Arguments, or in the Alternative for Leave to File Sur-Reply, dated Sep. 4, 2025, in 37 pages.
Central District Court of California 2:25-cv-4573, Documents 42 to 45, Reply in Support of Motion for Preliminary Injunction, with supporting Yang and Bayramoglu Declarations and various exhibits, dated Aug. 29 and 30, 2025, in 100 pages.
Central District Court of California 2:25-cv-4573, Document 46, Zheng Declaration in Support of Reply re: Preliminary Injunction Motion, dated Aug. 30, 2025, in 7 pages.
Central District Court of California 2:25-cv-4573, Exhibit B to Zheng Declaration (Document 46)—purported printout of Amazon listing for ASIN B003ES5TM4 Olympia Tools 85-404 Pack-N-Roll, dated Aug. 30, 2025, in 7 pages.
Central District Court of California 2:25-cv-4573, Exhibit C to Zheng Declaration (Document 46)—purported printout of Amazon listings for ASINs B003ES5TM4 and B000UZ0P7I, dated Aug. 30, 2025, in 25 pages.
Central District Court of California 2:25-cv-4573, Exhibit D to Zheng Declaration (Document 46)—purported printout of Amazon listing for ASIN B0BYR7L319, dated Aug. 30, 2025, in 22 pages.
Central District Court of California 2:25-cv-4573, Exhibit E to Zheng Declaration (Document 46)—purported printout of Amazon Seller Central Selling Policies and Seller Code of Conduct, dated Aug. 30, 2025, in 5 pages.
Central District Court of California 2:25-cv-4573, Exhibit F to Zheng Declaration (Document 46)—purported printout of Amazon Seller Central Customer Product Reviews Policies, dated Aug. 30, 2025, in 6 pages.
Central District Court of California 2:25-cv-4573, Exhibit G to Zheng Declaration (Document 46)—purported printout of Amazon listings for ASIN B0FCCPWYTM, dated Aug. 30, 2025, in 9 pages.
Central District Court of California 2:24-cv-10694, Document 66, Motion for Judgment on the Pleadings as to All Inequitable Conduct Claims, dated Sep. 5, 2025, in 25 pages.
Central District Court of California 2:24-cv-10694, Document 67, Response to Motion for Judgment on the Pleadings, dated Sep. 19, 2025, in 28 pages.
Central District Court of California 2:24-cv-10694, Document 68, Reply in Support of Motion for Judgment on the Pleadings, dated Sep. 26, 2025, in 15 pages.
Central District Court of California 2:24-cv-10694, Preliminary Invalidity Contentions, with claim chart Exhibits D13-15, dated Sep. 15, 2025, in 394 pages.
Central District Court of California 2:24-cv-10694, Exhibit D1 to Preliminary Invalidity Contentions—purported printout of Amazon ASIN B07YFFPK7B listings, dated Sep. 15, 2025, in 17 pages.
Central District Court of California 2:24-cv-10694, Exhibit D2 to Preliminary Invalidity Contentions—purported printout of Amazon listing of Olympia Tools 85-015 cart, dated Sep. 15, 2025, in 15 pages.

(56) References Cited

OTHER PUBLICATIONS

Central District Court of California 2:24-cv-10694, first portion of Exhibit D3 to Preliminary Invalidity Contentions—purported printout of Amazon listing of dbest Quik Cart Sport, dated Sep. 15, 2025, in 13 pages.
Central District Court of California 2:24-cv-10694, second portion of Exhibit D3 to Preliminary Invalidity Contentions—records of U.S. Trademark Reg. No. 2797558 for Quik Cart, dated Sep. 15, 2025, in 7 pages.
Central District Court of California 2:24-cv-10694, Exhibit D4 to Preliminary Invalidity Contentions—purported printout of Amazon direct and archived ASIN B001QKGLZQ listings, dated Sep. 15, 2025, in 13 pages.
Central District Court of California 2:24-cv-10694, Exhibit D5 to Preliminary Invalidity Contentions—purported printout of Amazon direct and archived ASIN B0BN2ZCQ9C listings, dated Sep. 15, 2025, in 13 pages.
Central District Court of California 2:24-cv-10694, Exhibit D6 to Preliminary Invalidity Contentions—purported printout of Amazon direct and archived ASIN B07PG4BZYG listings, dated Sep. 15, 2025, in 26 pages.
Central District Court of California 2:24-cv-10694, Exhibit D11 to Preliminary Invalidity Contentions—purported printout of direct and archived Amazon ASIN B0B4FZWRVR listings, dated Sep. 15, 2025, in 25 pages.
Central District Court of California 2:24-cv-10694, Storage Cart Installation Manuals produced with Preliminary Invalidity Contentions, dated Sep. 15, 2025, in 11 pages.
Central District Court of California 2:25-cv-11331, Document 12-2, Defendant's Motion for Preliminary Injunction, dated Jan. 20, 2026, in 29 pages.
Central District Court of California 2:25-cv-11331, Document 12-2, purported printout of Amazon listing for ASIN B0B4FZWRVR, dated Jan. 20, 2026, in 15 pages.
Central District Court of California 2:25-cv-11331, Document 12-25, claim charts, dated Jan. 20, 2026, in 34 pages.
Central District Court of California 2:25-cv-11331, Document 12-26, claim charts, dated Jan. 20, 2026, in 15 pages.
Central District Court of California 2:25-cv-11331, Document 12-31, purported printout of Amazon listing for ASIN B0CDBZHPYF, dated Jan. 20, 2026, in 14 pages.
Central District Court of California 2:25-cv-11331, Document 12-32, purported printout of Amazon Help & Customer Service, Understanding Customer Reviews and Ratings, dated Jan. 20, 2026, in 6 pages.
Central District Court of California 2:25-cv-11331, Document 12-33, purported printout of Amazon listing for ASIN B0CFDCLJ3G, dated Jan. 20, 2026, in 18 pages.
Central District Court of California 2:25-cv-11331, Document 12-34, Quick Cart Trademark filing receipt of Dec. 23, 2009 for Combined Declaration of Use and Incontestability under Sections 8 &15, dated Jan. 20, 2026, in 7 pages.
Central District Court of California 2:25-cv-11331, Document 12-35, purported printout of Amazon listing for ASIN B001QKGLZQ, 2 Pack, dated Jan. 20, 2026, in 6 pages.
Central District Court of California 2:25-cv-11331, Document 12-38, Declaration of Simin Chen Re: Defendant's Motion for Preliminary Injunction, dated Jan. 20, 2026, in 6 pages.
Central District Court of California 2:25-cv-11331, Document 12-39, Declaration of Xuhong Chen Re: Defendant's Motion for Preliminary Injunction, dated Jan. 20, 2026, in 16 pages.
AMAZON.com, "Foldable Utility Cart Portable Rolling Crate Handcart Shopping Trolley Collapsible 4 Rotate Wheels with Durable Heavy Duty Plastic Telescoping Handle for Travel Shopping Moving Storage Office Use", Available online □ at: "https://www.amazon.com/Portable-Handcart-Telescoping-Collapsible-Shopping/dp/B08HT17X39?th=1", Retrieved on Sep. 6, 2023, 8 pages.
AMAZON.com, Foldable Utility Cart Folding Portable Rolling Crate Handcart with Durable Heavy Duty Plastic Telescoping Handle Collapsible 4 Rotate Wheels for Travel Shopping Moving Luggage Office Use (Red), Available onl i ne at: "https://www.amazon.com/Fol dable-Portabl e-Handcart-T el escopi ng-Col lapsi bl e/dp/B07YFG4BW6/ref=sr_ 1_ 1 ?dchild=1&keywords=B07YFG4BW6&qid=1627442148&sr=8-1 &th=1" Retrieved on Sep. 6, 2023, 9 pages.
AMAZON.com, "Olympia Tools 85-015 Grand Folding Storage Rolling Cart with Telescopic Handle for Easy Transportation, Weight Capacity up to 150 Pounds", Available online at: "https://www.amazon.ca/Pack-NRoll-85-015-917-85-015-Portable-Capacity/dp/B076D9XG7T?th=1", Retrieved on Sep. 6, 2023, 7 pages.
AMAZON.com, "Olympia Tool 85-010 Grand Pack-N-Roll Portable Tool Carrier, Black" Available online at: "https://web. archive. org/web/20150727103951 /http://www. amazon.com: 80/Olym pia-85-010-Pack-N-Rol l-Portable-Carrier/dp/ B000UZ0P71", Retrieved on Sep. 6, 2023, 5 pages.
Bed Bath and Beyond.com, "Folding Crate Cart in Grey", 2022, 9 pages.
EBAY.com, "Dbest Products Quik Cart Elite Stair Climber wheeled rolling crate", May 31, 2022, 4 pages, https://www.ebay. co m/itm/394062298897.
Global Industrial, "Olympia Tools Grand Pack-N-Roll® Rolling Folding Crate Cart 85-010—80 Lb. Capacity", Available online at: "https://www. globali ndustrial. com/p/pack-n-roll-grand-rol li ng-foldi ng-crate-cart-85-01 0", Retrieved on Sep. 6, 2023, 3 pages.
"Utility Carts", Web page <https://www.amazon.com/Foldable-Portable-Handcart-Telescoping-Collapsible/dp/B07YFG4BW6/ref=sr_ 1_ 1? dchild=l &keywords=B07YFG4BW6&qid=l 627442148 &sr=8-1 >, 16 pages, retrieved on Aug. 19, 2021.
amazon.com "Felicon Selorss Foldable Utility Cart Folding Portable Rolling Crate Handcart with Durable Heavy Duty Plastic Telescoping Handle Collapsible 4 Rotate Wheels for Travel Shop Move Luggage Office(Black)" Available online at: "https://www.amazon.com/dp/B07YFFPK7B?th=1", retrieved on Jul. 17, 2025, 15 pages.
amazon.com "Haixin Closet Organizers and Storage—Trunk Car Organizer with Lids and Doors, Dorm Room Essentials, 8.4 Gal Collapsible Stackable Storage Bins, Plastic, 3 Pack", Available online at "https://www.amazon.com/dp/B0B4FZWRVR?th=1", retrieved Jul. 17, 2025, 15 pages.
amazon.com "dbest products Quik Cart Sport Collapsible Rolling Crate on Wheels for Teachers Tote Basket 80 lbs Capacity, Made from Heavy Duty Plastic Used as a Seat, Black", Available online at "https://www.amazon.com/dp/B0CFDCLJ3G?th=1", retrieved Jul. 17, 2025, 13 pages.
Central District Court of California Case 2:23-cv-5982, Document 1, Complaint for Declaratory Judgment of Patent Invalidity; Tortious Interference; and Unfair Competition, dated Jul. 24, 2023, in 10 pages.
Central District Court of California, Case 2:23-cv-5982, Document 27, Plaintiff's Counterclaims and Answer to Defendants' Counterclaims, dated Oct. 23, 2023, in 13 pages.
Central District Court of California, Case 2:24-cv-10694, Document 57, Third Amended Complaint for Declaratory Judgment and Other Relief, dated Jul. 18, 2025, in 37 pages.
Central District Court of California, Case 2:24-cv-10694, Document 59, Answer, Affirmative Defenses, and Counterclaims to Third Amended Complaint, with accompanying preliminary infringement claim charts, dated Jul. 22, 2025, in 155 pages.
Central District Court of California, Case 2:24-cv-10842, Document 21, Seespring's Second Amended Complaint, dated May 10, 2025, in 15 pages.
Central District Court of California, 2:24-cv-10961, Document 23, Aborder Products, Inc's Second Amended Complaint for Declaratory Judgment and Other Relief, with accompanying U.S. Appl. No. 63/577,068, dated May 6, 2025, in 28 pages.
Central District Court of California, Case 2:25-cv-350, Document 19, Second Amended Complaint for Declaratory Judgment, with accompanying non-infringement contentions, invalidity contentions, and alleged prior art references, dated May 2, 2025, submitted in parts A and B in 101 pages.
Central District Court of California, Case 2:25-cv-471, Document 23, First Amended Complaint for Damage and for Declaratory Judgment of Non-Infringement of U.S. Pat. No. 12,103,576, with

(56) References Cited

OTHER PUBLICATIONS accompanying alleged prior art disclosure claim charts, references, and search report documents, dated Apr. 18, 2025, submitted in parts A and B in 342 pages.
Central District Court of California, Case 2:25-cv-584, Document 21, First Amended Complaint for Damage and for Declaratory Judgment of Non-Infringement of U.S. Pat. No. 12,103,576, with accompanying alleged alleged prior art disclosure claim charts, references, and search report documents, dated Apr. 18, 2025, submitted in parts A and B in 339 pages.
Central District Court of California, Case 2:25-cv-2311, Document 1, Complaint for Declaratory Judgment of Patent Non-Infringement and Patent Invalidity, dated Mar. 14, 2025, in 19 pages.
Central District Court of California, Case 2:25-cv-4573, Document 16, Defendant's Answer to Plaintiff's Complaint, Affirmative Defenses, and Counterclaims, dated Jul. 10, 2025, in 46 pages.
Central District Court of California, Case 2:25-cv-4573, Document 17, Defendant and Counterclaimant's Application for Temporary Restraining Order and Order to Show Cause Why a Preliminary Injunction Should Not Issue, with accompanying alleged prior art references, invalidity claim charts, and non-infringement claim charts, dated Jul. 11, 2025, in 107 pages.
Central District Court of California, Case 2:25-cv-4573, Document 19, Civil Minutes, dated Jul. 11, 2025, in 3 pages.
Central District Court of California, Case 2:25-cv-4573, Document 21, Counterclaimant's Second Application for Temporary Restraining Order and Order to Show Cause Why a Preliminary Injunction Should Not Issue, with accompanying declaration and exhibit, dated Jul. 15, 2025, in 28 pages.
Central District Court of California, Case 2:25-cv-4573, Document 22, Plaintiff's Opposition to Defendant's Second Ex Parte Application for Temporary Restraining Order and Order to Show Cause Why a Preliminary Injunction Should Not Issue, with accompanying declaration and exhibit, dated Jul. 16, 2025, in 46 pages.
Central District Court of California, Case 2:25-cv-4573, Document 23, Civil Minutes, dated Jul. 17, 2025, in 4 pages.
Central District Court of California, Case 2:25-cv-4573, Document 24, Counterclaimant's Ex Parte Application for Reconsideration of Order Denying Second Ex Parte Application for Temporary Restraining Order, dated Jul. 23, 2025, in 23 pages.
Central District Court of California, Case 2:25-cv-4573, Document 26, Civil Minutes, dated Jul. 25, 2025, in 3 pages.
Central District Court of California, Case 2:25-cv-4573, Document 27, Counterclaimant's Motion for Preliminary Injunction, with accompanying alleged prior art references, invalidity claim charts, and non-infringement claim charts, dated Jul. 29, 2025, in 107 pages.
District Court of New Jersey, Civil Action No. 2:23-cv-2675, Document 4, First Amended Complaint, dated Jul. 17, 2023, in 5 pages.
Southern District Court of New York, Civil Action No. 1:25-cv-353, Document 7, Amended Complaint, dated Jan. 14, 2025, in 12 pages.
Southern District Court of New York, Civil Action No. 7:24-cv-10019, Document 24, Amended Complaint, dated Jun. 8, 2025, in 22 pages.
Southern District Court of New York, Civil Action No. 1:24-cv-10045, Document 22, Plaintiff Sanders Collection Inc's First Amended Complaint, with accompanying letter and alleged prior art references, dated Apr. 25, 2025, in 111 pages.
Western District Court of Washington, Case 2:24-cv-2043, Document 1, Complaint for Declaratory Judgment, with accompanying alleged prior art exhibits, dated Dec. 11, 2024, in 113 pages.
Western District Court of Washington, Case 2:25-cv-288, Document 1, Complaint for Declaratory Judgement, dated Feb. 13, 2025, in 10 pages.
Western District Court of Washington, Case 2:25-cv-370, Document 10, Complaint for Declaratory Judgment, with accompanying non-infringement claim charts, invalidity claim charts, and alleged prior art references, dated May 22, 2025, in 136 pages.
"Packster"TM flyer/advertisement by Direct Source International, LLC, copy filed in Central District Court of California, Case No. 2:07-cv-4895 on Dec. 30, 2008, in 1 page.
Central District Court of California, 2:25-cv-4573, Document 40, Plaintiff's Opposition to Motion for a Preliminary Injunction, with accompanying declarations, asserted claims, preliminary infringement charts, and related materials, dated Aug. 22, 2025, in 242 pages.
District Court of New Jersey, Civil Action No. 2:24-cv-4523, Document 4, First Amended Complaint, dated Jul. 17, 2023, in 5 pages.
U.S. Pat. No. 11,338,835, Request for Ex Parte Examination, dated May 8, 2026, in 68 pages.
U.S. Pat. No. 11,338,835, Patent Owner Pre-Order Statement, dated Jun. 8, 2026, in 9 pages.
U.S. Pat. No. 11,338,835, Statutory Disclaimer of Patent Claims 9-16, dated Jun. 8, 2026, in 2 pages.
Central District Court of California 2:25-cv-11331, Document 12, Defendant's Motion for Preliminary Injunction and supporting Exhibits 2, 25, 26, 31-35 and declarations, dated Jan. 20, 2026, submitted in parts 1 and 2 in 166 pages.
Central District Court of California 2:25-cv-11331, Document 42, Opposition to Motion for Preliminary Injunction, with supporting declarations, dated Mar. 6, 2026, in 42 pages.
Central District Court of California 2:25-cv-11331, Document 49, Reply in Support of Motion for Preliminary Injunction, with Exhibits 1 and 2, dated Mar. 13, 2026, in 30 pages.
Central District Court of California 2:25-cv-11331, Document 51, First Amended Counterclaim with supporting Exhibits 1-9, dated Mar. 17, 2026, in 66 pages.
Central District Court of California 2:25-cv-11331, Document 53, Order, dated Mar. 24, 2026, in 5 pages.
Central District Court of California 2:25-cv-11331, Document 54, Answer to First Amended Counterclaim, dated Apr. 1, 2026, in 7 pages.
Central District Court of California 2:25-cv-11331, Document 56, Motion for Preliminary Injunction with supporting Exhibits 7 and 10 and declaration, dated Apr. 12, 2026, in 66 pages.
Central District Court of California 2:25-cv-11331, Document 61, Opposition to Motion for Preliminary Injunction, dated May 1, 2026, in 30 pages.
Central District Court of California 2:25-cv-11331, Document 62, Reply in Support of Motion for Preliminary Injunction, with Exhibits 1 and 2, dated May 8, 2026, in 16 pages.
Central District Court of California 2:25-cv-11331, Document 64, Order Denying Motion for Preliminary Injunction, dated May 21, 2026, in 16 pages.
Central District Court of California 2:25-cv-11331, Plaintiff's Infringement Contentions, dated May 29, 2026, in 100 pages.
Central District Court of California 2:26-cv-3255, Document 1, Complaint with supporting exhibits 5, 9, 11, and 12 and declaration, dated Mar. 26, 2026, in 68 pages.
Central District Court of California 2:26-cv-3255, Document 17, Motion for Preliminary Injunction and supporting Exhibits 4-6, 10, 12-14, 19, 20, and 31-34, dated Apr. 24, 2026, submitted in parts 1, 2, 3 and 4 in 161 pages.
Central District Court of California 2:26-cv-3255, Document 23, Answer and Counterclaims with supporting claim charts, dated May 15, 2026, in 35 pages.
Central District Court of California 2:26-cv-3255, Document 24, Opposition to Motion for Preliminary Injunction with supporting Exhibits 8-12, dated May 15, 2026, in 82 pages.
Central District Court of California 2:26-cv-3255, Document 29, Reply ISO Preliminary Injunction with supporting exhibits 1 and 2 and declaration, dated May 15, 2026, in 34 pages.
Central District Court of California 2:26-cv-3255, Document 32, Order denying Preliminary Injunction, dated Jun. 3, 2026, in 13 pages.
Central District Court of California 2:26-cv-3255, Document 33, Answer to Counterclaims, dated Jun. 4, 2026, in 16 pages.
Western District of Washington 2:25-cv-2359, Document 1, Complaint with supporting claim charts, dated Nov. 24, 2025, in 35 pages.

(56) References Cited

OTHER PUBLICATIONS

Western District of Washington 2:25-cv-2359, Document 5, Answer with supporting claim charts, dated Jan. 14, 2026, in 33 pages.
Western District of Washington 2:25-cv-2359, Invalidity and Non-Infringement Contentions, dated May 25, 2026, in 64 pages.
U.S. Appl. No. 19/211,055, Third-Party Submission Under 37 CFR 1.290, dated Oct. 12, 2025, in 126 pages.
U.S. Appl. No. 19/211,055, attachment to Third-Party Submission Under 37 CFR 1.290, purported Amazon printout of Amazon listing for ASIN B0BN2ZCQ9C, dated Oct. 11, 2025, in 24 pages.
U.S. Appl. No. 19/211,055, attachment to Third-Party Submission Under 37 CFR 1.290, purported Amazon printout of Amazon listing for ASIN B0B4FZWRVR, dated Oct. 11, 2025, in 22 pages.
U.S. Pat. No. 11,338,835, Order Granting Request for Ex Parte Reexamination, dated Jul. 7, 2026, in 19 pages.
Central District Court of California 2:25-cv-11331, Document 72, Motion for Judgment on the Pleadings as to all Inequitable Conduct Claims, dated Jul. 16, 2026, in 22 pages.
Western District of Washington 2:25-cv-2359, Asserted Claims and Infringement Contentions, with accompanying appendices, dated Apr. 16, 2026, in 52 pages.
Central District Court of California 26-cv-3249, Document 1, Complaint for Declaratory Judgment of Patent Non-Infringement and Invalidity, dated Jun. 11, 2026, in 128 pages.
Central District Court of California 26-cv-3249, Document 12, Answer, dated Jul. 20, 2026, in 9 pages.
Western District of Washington 2:25-cv-2359, dbest's Preliminary Claim Constructions, dated Jul. 13, 2026, in 4 pages.
Central District Court of California 2:25-cv-11331, Document 73, Defendant's Opposition to Plaintiff's Motion for Judgment on the Pleadings, dated Jul. 31, 2026, in 13 pages.
Central District Court of California 2:25-cv-11331, Document 74, Plaintiff's Reply in Support of its Motion for Judgment on the Pleadings Under FRCP9(b) and 12(b) as to All Inequitable Conduct Claims, dated Aug. 7, 2026, in 17 pages.
Central District Court of California 8:26-cv-01257, Document 1, Complaint with Exhibits B-G, dated May 19, 2026, in 55 pages.
Central District Court of California 8:26-cv-01257, Document 13, Answer and Counterclaim, dated Jul. 28, 2026, in 15 pages.
Central District Court of California 2:25-cv-11331, Document 75, Order Denying Without Prejudice Motion for Judgment on the Pleadings, dated Aug. 13, 2026, in 4 pages.
Central District Court of California 2:26-cv-03255, Disclosure of Asserted Claims and Infringement Contentions, dated Aug. 14, 2026, in 67 pages.

* cited by examiner

COLLAPSIBLE CONTAINERS

RELATED APPLICATIONS

This application is a continuation of application Ser. No. 18/161,677, filed on Jan. 30, 2023, which application is a continuation-in-part of and claims the benefit of the filing date of application Ser. No. 17/712,032, filed on Apr. 1, 2022 and issued as U.S. Pat. No. 11,565,735 on Jan. 31, 2023, the disclosure of which is incorporated herein by reference in its entirety, and which application was a continuation of and claims the benefit of the filing date of application Ser. No. 17/143,116, filed on Jan. 6, 2021 and issued as U.S. Pat. No. 11,338,835 on May 24, 2022, the disclosure of which is incorporated herein by reference in its entirety. This application claims the benefit of the filing date of U.S. Provisional Patent Application, Ser. No. 62/974,956, filed on Jan. 6, 2020, the disclosure of which is incorporated herein by reference in its entirety. This application also claims the benefit of the filing date of U.S. Provisional Patent Application, Ser. No. 62/995,375, filed on Jan. 27, 2020, the disclosure of which is incorporated herein by reference in its entirety.

FIELD OF THE INVENTION

This patent document relates to collapsible carts, and more particularly, to wheeled collapsible carts for high load capacity that is capable of folding up for convenient storage.

DESCRIPTION OF THE RELATED ART

Collapsible carts have been widely used in household and commercial settings. They provide a convenient way to transport objects when needed, but can be folded or collapsed for storage.

The following patents and published applications are representative prior art: 1. U.S. Pat. No. 2,564,939 issued to Louis S. Weast on Aug. 21, 1951 for "Foldable Shopping Cart"; 2. U.S. Pat. No. 2,786,692 issued to Anne Jackson Timpson on Mar. 26, 1957 for "Collapsible Cart"; 3. U.S. Pat. No. 3,092,395 issued to Sol Mitty et al. on Jun. 4, 1963 for "Corrugated Shopping Cart and Parts"; 4. U.S. Pat. No. 3,135,527 issued to Philip B. Knapp on Jun. 2, 1964 for "Wheeled Market Carts"; 5. U.S. Pat. No. Des. 292,135 issued to John W. Grube et al. on Sep. 29, 1987 for "Collapsible Cart"; 6. U.S. Pat. No. 4,765,644 issued to Laurence G. Bell on Aug. 23, 1988 for "Foldable Cart"; 7. U.S. Pat. No. 4,765,646 issued to Karen Cheng on Aug. 23, 1988 for "Collapsible Shopping Cart"; 8. U.S. Pat. No. 5,197,754 issued to Lyla B. Ward on Mar. 30, 1993 for "Collapsible Beach Cart"; 9. U.S. Pat. No. 5,244,219 issued to Sidney R. Hadlum on Sep. 14, 1993 for "Hand Held Carrier"; 10. U.S. Pat. No. 5,988,671 issued to Kevin G. Abelbeck et al. on Nov. 23, 1999 for "Collapsible Cart"; 11. United States Published Patent Application No. 2002/0050429 to Cory O. Nykoluk et al. on May 2, 2002 for "Pivotal Handle For Towable Baggage"; 12. United States Published Patent Application No. 2002/0139628 to Wen-Cheng Chang on Oct. 3, 2002 for "Retractable Handle Assembly"; 13. United States Published Patent Application No. 2002/0144874 to Cory O. Nykoluk et al. on Oct. 10, 2002 for "Pivotal Handle For Towable Baggage"; 14. U.S. Pat. No. 6,598,898 issued to Yong S. Chu on Jul. 29, 2003 for "Folding Cart"; 15. U.S. Pat. No. D477,916 issued to Cory O. Nykoluk on Aug. 5, 2003 for "Towing Member For A Piece of Baggage"; 16. U.S. Pat. No. 6,651,791 issued to Cory O. Nykoluk et al. on Nov. 25, 2003 for "Pivotal Handle For Towable Baggage"; 17. United States Published Patent Application No. 2004/0211635 to Chen-Tien Lu on Oct. 28, 2004 for "Apparatus for Mounting Telescopic Handle on Trunk"; 18. U.S. Pat. No. 6,918,474 issued to Cory O. Nykoluk on Jul. 19, 2005 for "Towable Wheeled-Backpack"; 19. United States Published Patent Application No. 2009/0212536 to Maria I. Tadeo on Aug. 27, 2009 for "Collapsible Rolling Tote Bag"; 20. U.S. Pat. No. 7,731,221 issued to Suzan L. Bess on Jun. 8, 2010 for "Collapsible and Portable Wheeled Dolly Particularly Suitable for Use by Students or Others in the Transport of Items"; 21. U.S. Pat. No. 7,066,476 issued to the named inventor Richard Elden on Jun. 27, 2006 for "Side Attachable Cover/Seat for a Cart Carrying Box"; and 22. U.S. Pat. No. 8,439,374 issued to the named inventor Richard Elden on May 14, 2013 for "Lightweight High Load Capacity Folding Utility Cart with Unique Support Structure and Ergonomic Handle."

Because of the collapsible nature of the prior art cart design, the sidewalls may not be sufficiently sturdy to allow for transporting heavy objects. None of the prior art has effectively addressed this problem. Thus, the need for improvements to collapsible carts still remains.

SUMMARY

Collapsible carts are disclosed herein. The collapsible carts may include a rigid frame forming a compartment, and having a front wall, a rear wall, a right sidewall, a left sidewall, and a bottom wall. The right sidewall may include a first right panel and a second right panel, whereby the first right panel is coupled to the second right panel along a first vertical axis. The left sidewall may include a first left panel and a second left panel, whereby the first left panel is coupled to the second left panel along a second vertical axis.

In one embodiment, the collapsible carts may include a rotatable base panel rotatably coupled to the bottom wall within the compartment, and having a lower surface and an upper surface. The rotatable base panel may be configured to be capable of rotating so that its lower surface rests against an interior surface of the bottom wall.

In another embodiment, the collapsible carts may include one or more tracks extending across the first vertical axis from a first position on the second right panel to a second position on the first right panel. The collapsible carts may also include one or more slideable members to cooperatively engage the one or more tracks, and movable between an open position to allow the right sidewall to fold inwardly, to a closed position to selectively lock the first right panel to the second right panel. The one or more slideable members are in the open position when adjacent the second position of the one or more tracks and in the closed position when adjacent the first position of the one or more tracks.

In yet another embodiment, the collapsible carts may include one or more tracks extending across the second vertical axis from a first position on the first left panel to a second position on the second left panel. The collapsible carts may also include one or more slideable members to cooperatively engage the one or more tracks, and movable between an open position to allow the left sidewall to fold inwardly, to a closed position to selectively lock the first left panel to the second left panel. The one or more slideable members are in the open position when adjacent the second position of the one or more tracks and in the closed position when adjacent the first position of the one or more tracks.

In yet another embodiment, the collapsible carts may include a plurality of wheel assemblies, such as a plurality of rotatable swivel wheels mounted at one or more locations underneath the bottom wall, or a plurality of wheels rotatably coupled to a plurality of spokes, where each spoke is coupled to a spindle located underneath the bottom wall or at the intersection between the bottom wall and the rear wall.

In one embodiment, the a plurality of rotatable swivel wheels coupled to the bottom wall of the cart include at least one wheel locking assembly having a first condition for locking at least one of the rotatable swivel wheels to prevent rolling movement, and a second condition for unlocking the at least one of the rotatable swivel wheels. The at least one wheel locking assembly comprising a brake actuator pedal.

In yet another embodiment, the collapsible carts include a rigid cover panel and a retractable handle. The rigid cover panel may be configured to confirm in shape to a top opening of the compartment, and securely fitting in a first position over the top opening to serve as a cover or seat on top of the cart. The rigid cover panel may include protrusions or a latch on a bottom surface to removably secure to the front wall of the cart. The retractable handle adjacent the back wall.

Each of the foregoing various aspects, together with those set forth in the claims and described in connection with the embodiments summarized above and disclosed herein may be combined to form claims for a device, apparatus, system, methods of manufacture and/or use in any way disclosed herein without limitation.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DETAILED DESCRIPTION

Figure 1:
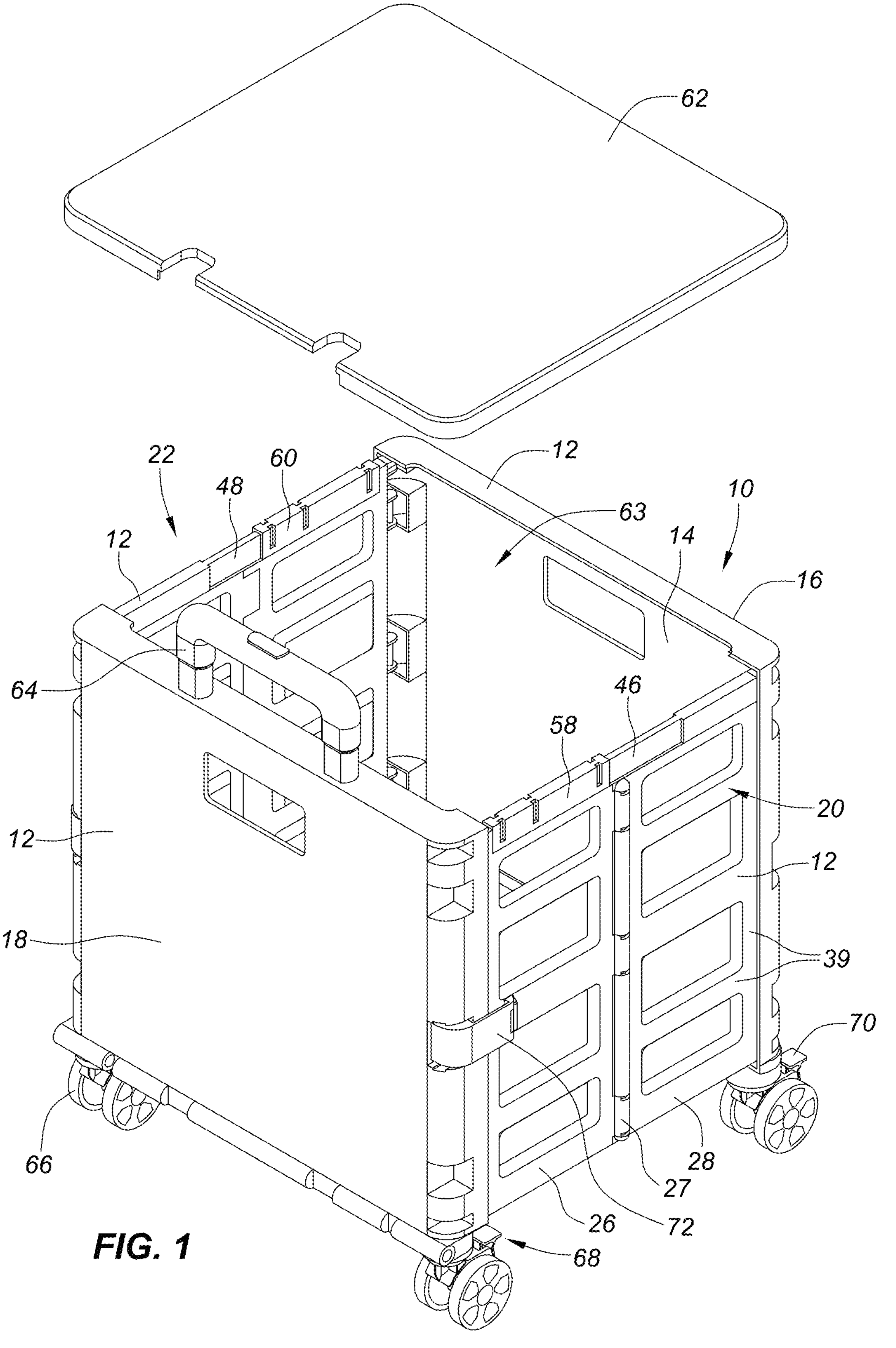
FIG. 1 is a perspective view of a collapsible cart illustrated in an open condition, according to an embodiment.
Figure 2:
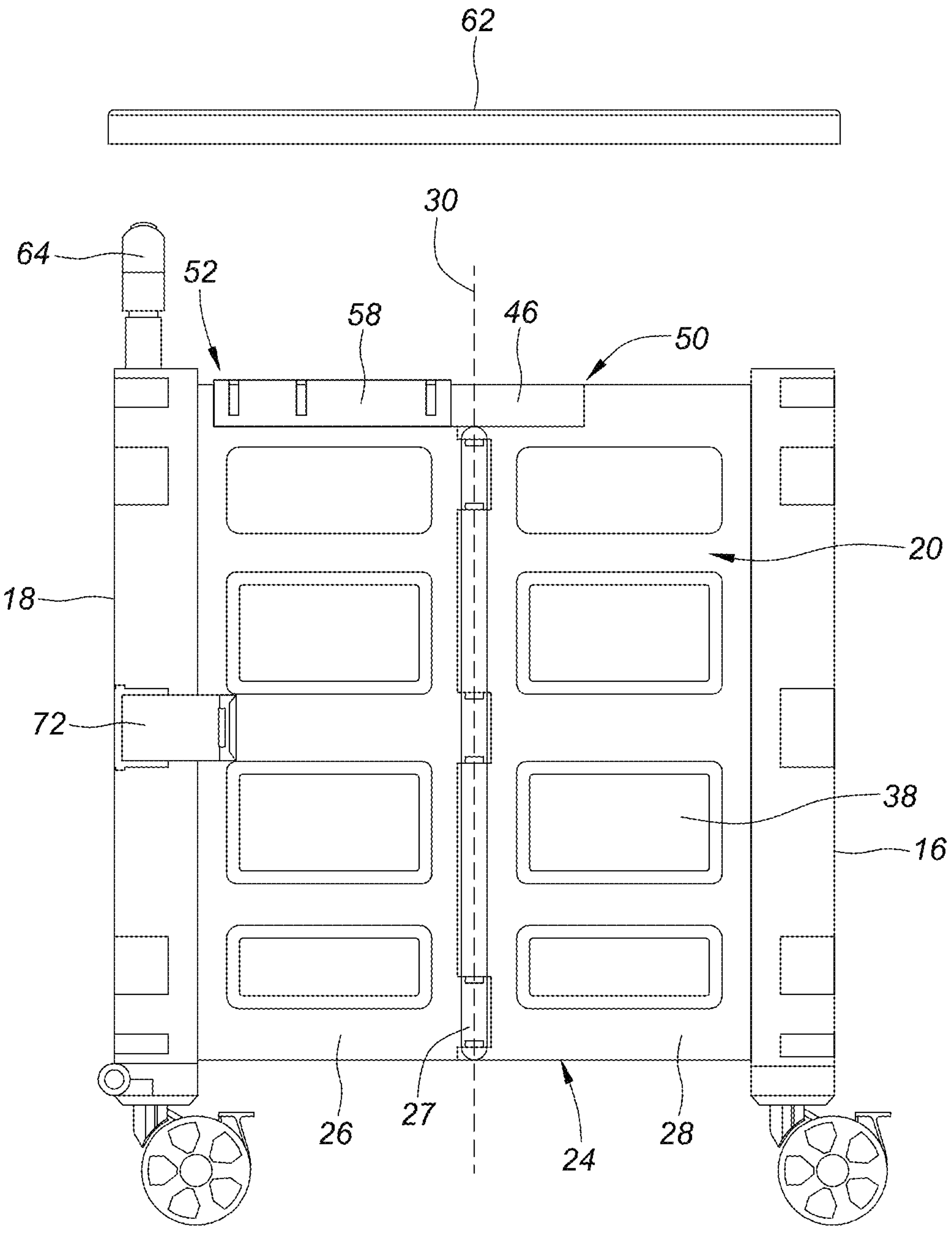
FIG. 2 is a right side view of the collapsible cart of FIG. 1, according to an embodiment.
Figure 3:
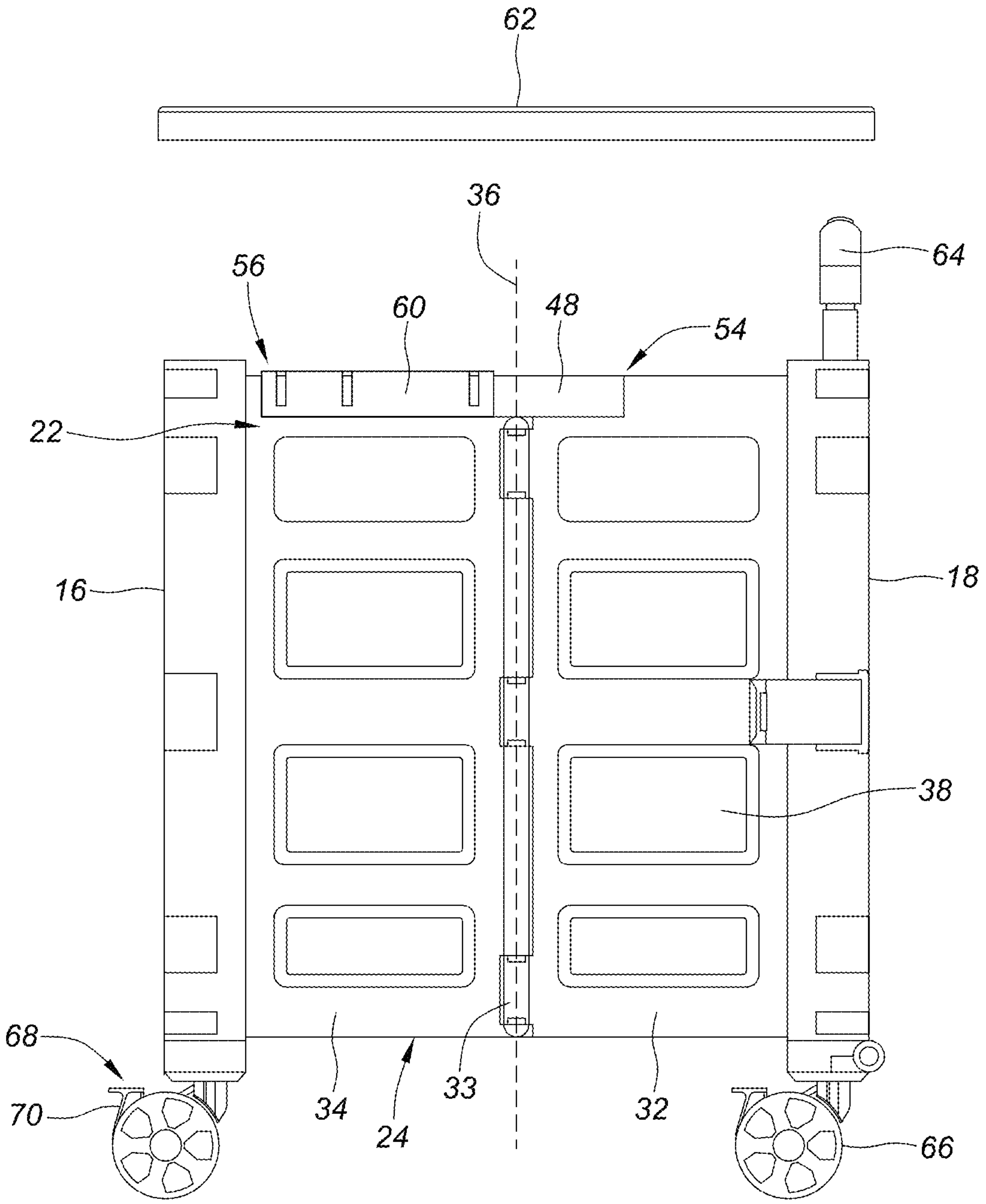
FIG. 3 is a left side view of the collapsible cart of FIG. 1, according to an embodiment.
Figure 4:
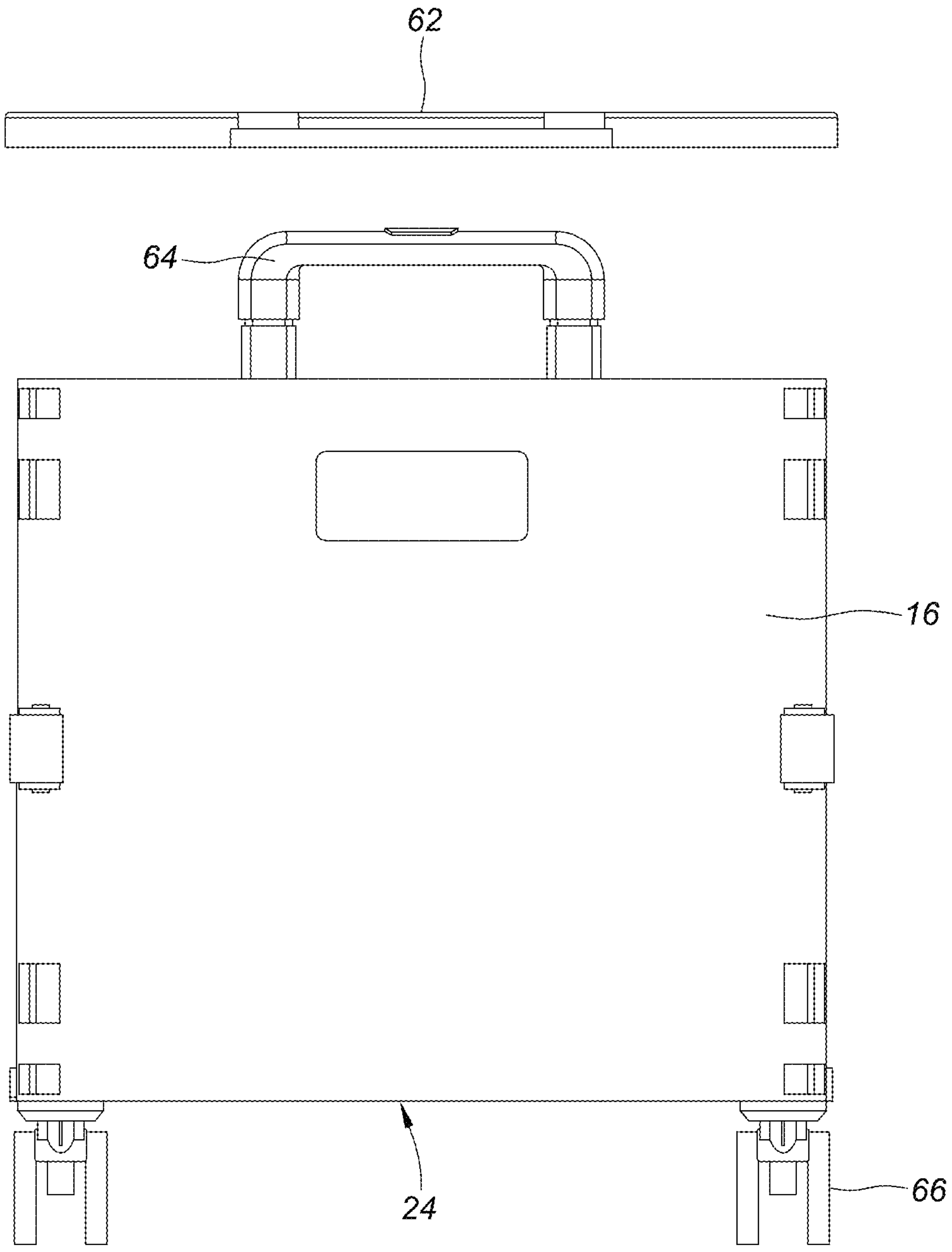
FIG. 4 is a front plan view of the collapsible cart of FIG. 1, according to an embodiment.
Figure 5:
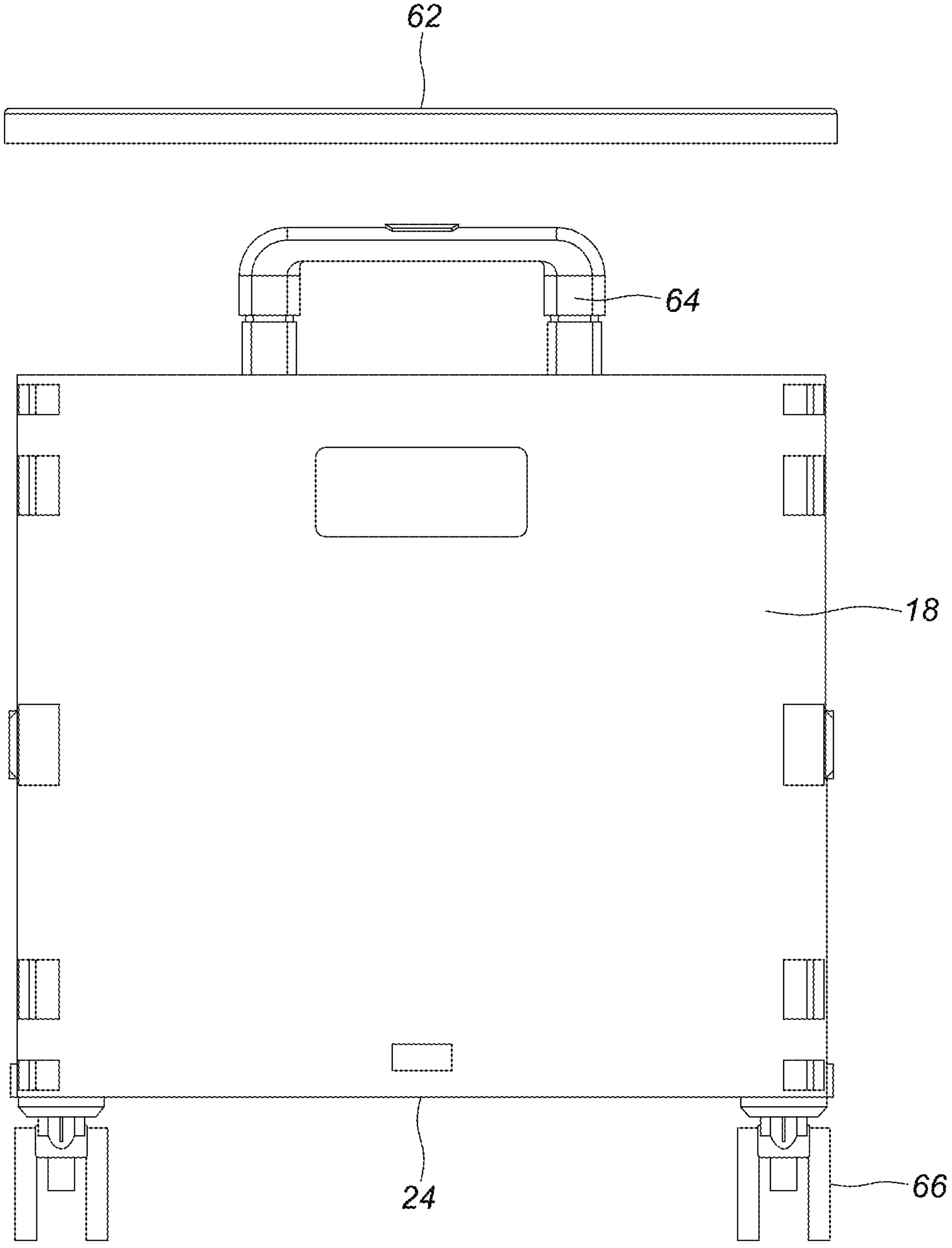
FIG. 5 is a rear plan view of the collapsible cart of FIG. 1, according to an embodiment.
Figure 6:
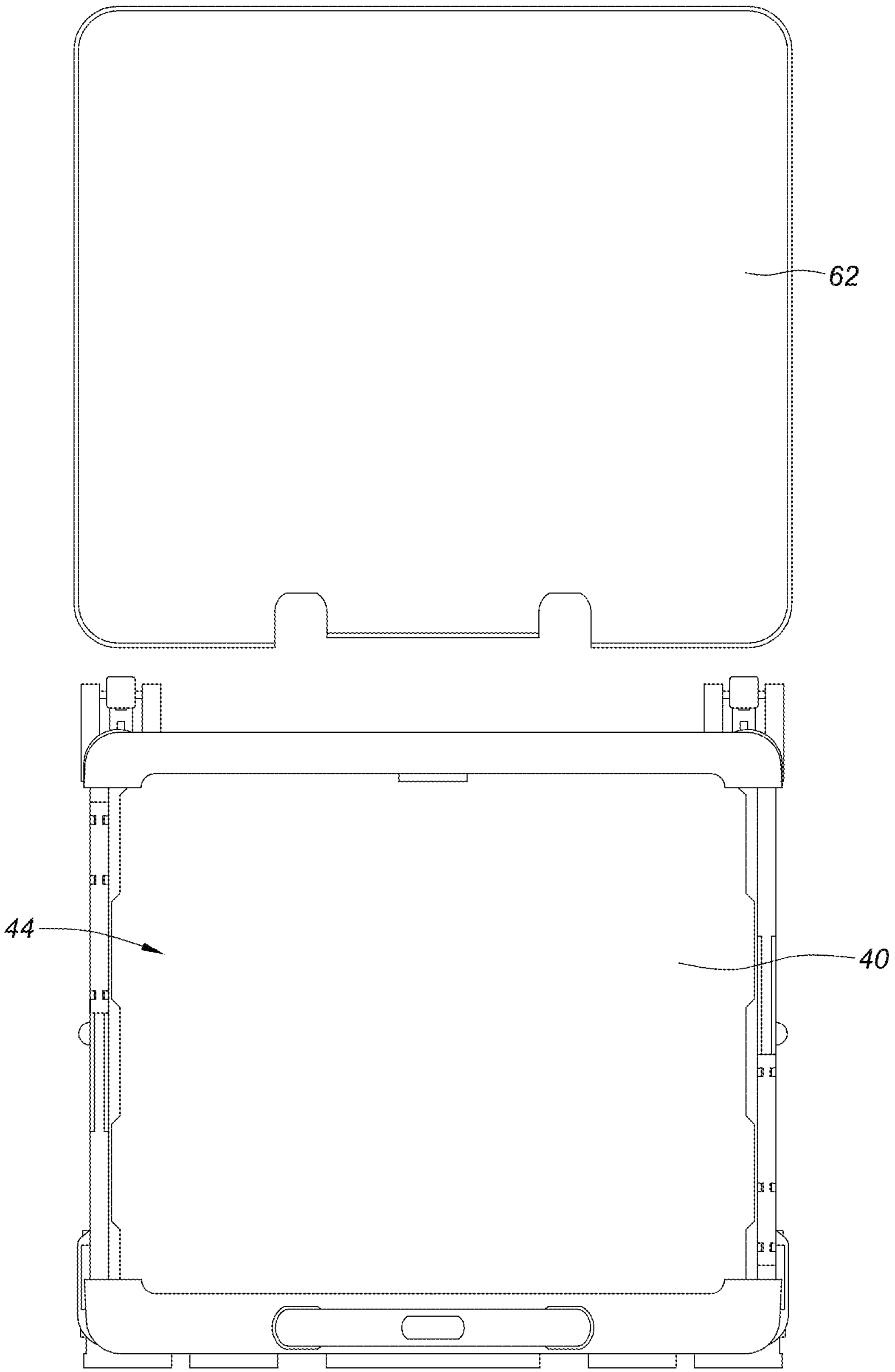
FIG. 6 is a top view of the collapsible cart of FIG. 1, according to an embodiment.
Figure 7:
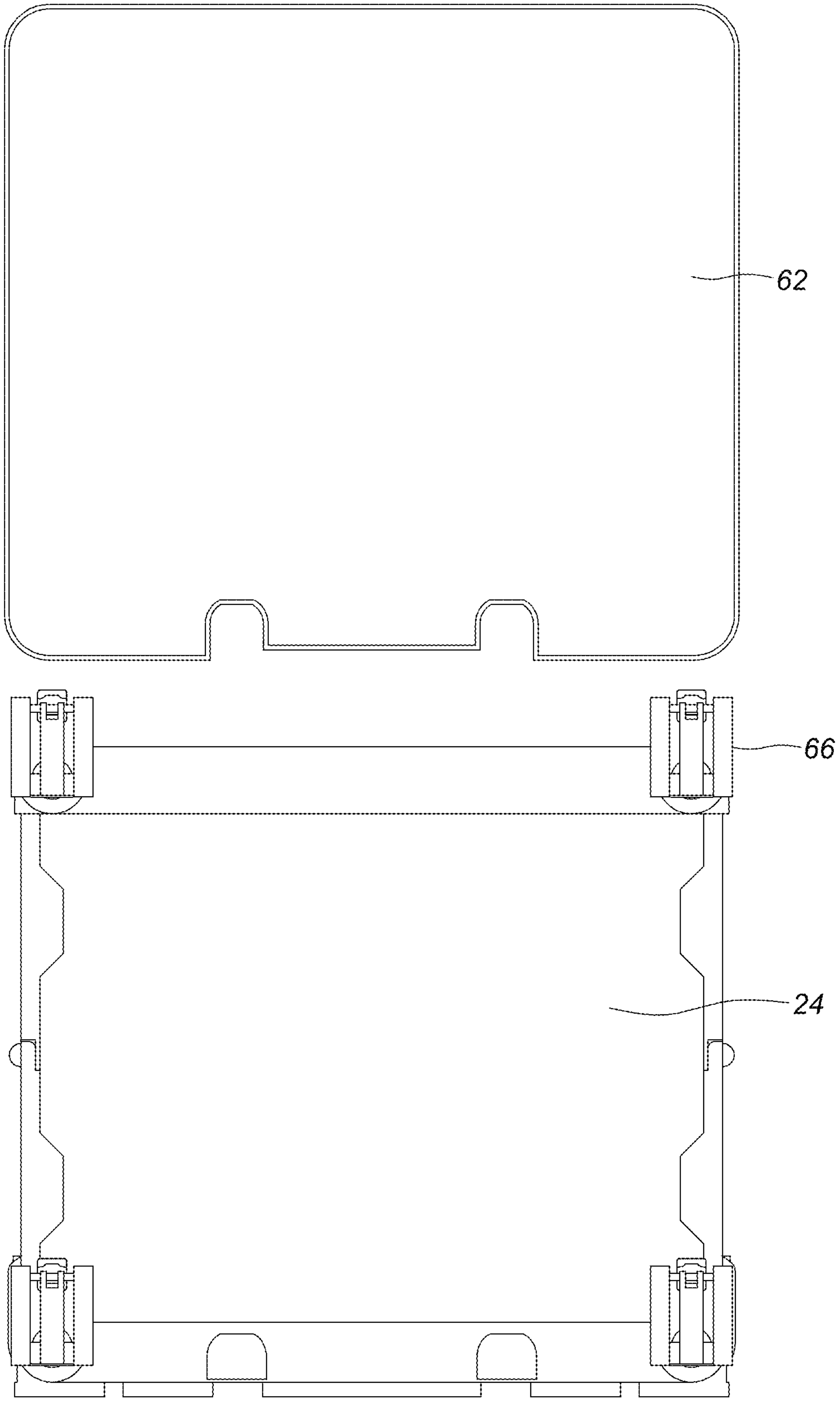
FIG. 7 is a bottom view of the collapsible cart of FIG. 1, according to an embodiment.

Unique and inventive collapsible carts are disclosed herein. Although embodiments of collapsible carts are disclosed herein, it is to be expressly understood that the present invention is not restricted solely to such embodiments. Rather, the present disclosure is directed to each of the inventive features described below, both individually as well as collectively, in various embodiments. Further, as will become apparent to those skilled in the art, one or more aspects of the present disclosure may be incorporated in other devices.

FIGS. 1-9 illustrate an embodiment of a collapsible cart 10 with swivel wheels, according to an embodiment. The collapsible cart 10 may include a rigid frame 12 forming a compartment 14. The rigid frame may a front wall 16, a rear wall 18, a right sidewall 20, a left sidewall 22, and a bottom wall 24. The right sidewall 20 and the left sidewall 22 are adapted to fold inwardly. The right sidewall 20 may include a first right panel 26 and a second right panel 28. The first right panel 26 may be coupled with a first hinge 27 to the second right panel 28 along a first vertical axis 30. The left sidewall 22 may include a first left panel 32 and a second left panel 34. The first left panel 32 may be coupled with a second hinge 33 to the second left panel 34 along a second vertical axis 36.

As can be appreciated, the first right panel 26, the second right panel 28, the first left panel 32 and the second left panel 34 may be formed of molded rigid plastic. In one embodiment, the first right panel 26, the second right panel 28, the first left panel 32 and the second left panel 34 may each be a solid panel member. In another embodiment, the first right panel 26, the second right panel 28, the first left panel 32 and the second left panel 34 may each be configured in a frame structure with a plurality of apertures 38 positioned between vertical and horizontal rigid members 39. Artisans would appreciate that this configuration allows for light-weight construction of the sidewalls 20 and 22.

In one embodiment, the collapsible cart 10 may include a rotatable base panel 40 (shown in FIGS. 6 and 8) rotatably coupled to the bottom wall 24 within the compartment 14. The rotatable base panel 40 may include a lower surface 42 (shown FIG. 8) and an upper surface 44 (shown FIG. 6). As can be appreciated, when in use, the rotatable base panel 40 may be rotated so that its lower surface rests against an interior surface of the bottom wall 24.

In another embodiment, the collapsible cart 10 may include a first track 46 and a second track 48. The first track 46 may extend across the first vertical axis 30 from a first position 50 on the second right panel 28 to a second position 52 on the first right panel 26. The second track 48 may extend across the second vertical axis 36 from a first position 54 on the first left panel 32 to a second position 56 on the second left panel 34.

The collapsible cart 10 may also include a first slideable member 58 and a second slideable member 60. The first slideable member 58 may cooperatively engage the first track 46 and may be movable between an open position to allow the right sidewall 20 to fold inwardly (shown in FIG. 8), to a closed position to selectively secure or lock the first right panel 26 to the second right panel 28 (shown in FIG. 2). As can be appreciated, the first slideable member 58 is in the open position when adjacent the second position 52 of the first track 46 and is in the closed position when adjacent the first position 50 of the first track 46. Similarly, the second slideable member 60 may be cooperatively engage the second track 48 and may be movable between an open position to allow the left sidewall 22 to fold inwardly (shown in FIG. 8), to a closed position to selectively secure or lock the first left panel 32 to the second left panel 34. As can be appreciated, the second slideable member 60 is in the open position when adjacent the second position 56 of the second track 48 and is in the closed position when adjacent the first position 54 of the second track 48. In another embodiment, the collapsible cart 10 may include one only one slideable member on either one of the sidewalls 20 or 22. Alternatively, the collapsible cart 10 may include a plurality of slideable members for each sidewall 20 and 22.

In one embodiment, the collapsible cart 10 may include a rigid cover panel 62 and a retractable handle 64. The rigid cover panel 62 may be formed of a molded plastic with a ribbed pattern for increased rigidity. The rigid cover panel 62 may be configured to conform in shape and fit snugly to a top opening 63 of the compartment 14. The rigid cover panel 62 may securely fit in a first position over the top opening 63 to serve as a cover or seat on top of the collapsible cart 10. The rigid cover panel 62 may include one or more protrusions on a bottom surface to removably secure to the front wall 16 of the collapsible cart 10. Meanwhile, the retractable handle 64 may be positioned adjacent the back wall 12.

As shown in FIGS. 1-9, the collapsible cart 10 may include a plurality of rotatable swivel wheels 66 coupled to the bottom wall 24 of the collapsible cart 10. The rotatable swivel wheels 66 may include at least one wheel locking assembly 68 having a first condition for locking at least one of the rotatable swivel wheels to prevent rolling movement, and a second condition for unlocking the at least one of the rotatable swivel wheels. As can be appreciated, the at least one wheel locking assembly may include a brake actuator pedal 70.

FIGS. 10-18 illustrate an embodiment of a collapsible cart 100 with a pair of three-wheel assemblies 102, according to an embodiment. The collapsible cart 100 may include a spindle 104 rotatably coupled to the bottom wall 24 and adjacent an intersection of the bottom wall 24 and the rear wall 18. Each three-wheel assembly 102 may include three wheels 106, three spokes 108 and a central rotational point 110. As can be appreciated, each wheel 106 may be rotatably coupled to one of the three spokes 108, and each spoke 108 may be connected to the central rotational point 110 coupled to the spindle 104.

As can be appreciated, the collapsible cart 10 may be fabricated with a light-weight material, such as plastic. In one embodiment, one or more of the walls 16, 18, 20, 22 and 24 may be formed of a molded plastic with a ribbed pattern for increased rigidity.

In operation, the collapsible cart 10 and 100 is transitioned from a closed condition where it is folded up to an open position where it is expanded for use. In the closed condition (shown in FIGS. 9 and 18), a user may unlock clips 72 on the right side and left side to extend the right and left opposing sidewalls 20 and 22. The user may need to insert his or hands in the compartment 14 to push out the sidewalls 20 and 22. As the sidewalls 20 and 22 are pushed outwards, the rotatable base panel 40 drops down such that its lower surface rests against the interior surface of the bottom wall 24, and stabilizes the cart by fitting tightly between the lower region of the two opposing sidewalls 20 and 22. The first slideable member 58 and the second slideable member 60 may then be moved along their respective tracks 46 and 48 and from their respective open position to their respective closed position to selectively secure the sidewall panels. As can be appreciated, the slideable members 58 and 60 may be used to hold the extended sidewalls 20 and 22 in place. The rigid cover panel 62, which may be secured to the front wall 16 for storage, may be unlatched and securely fit over the top opening 63 of the compartment 14 to serve as a cover or seat. The collapsible cart 10 or 100 may be used to transport heavy loads in this open condition or may be collapsed in reverse fashion to place in a closed condition for storage.

Through significant field testing and development, it was discovered that the rigid cover panel 62 may be lost or unavailable at various points during usage of the collapsible cart 10 by the end user. Therefore, a new embodiment is now disclosed in FIGS. 19-26 that includes a movable latch that secures the cover panel to the collapsible cart 10.

Figure 8:
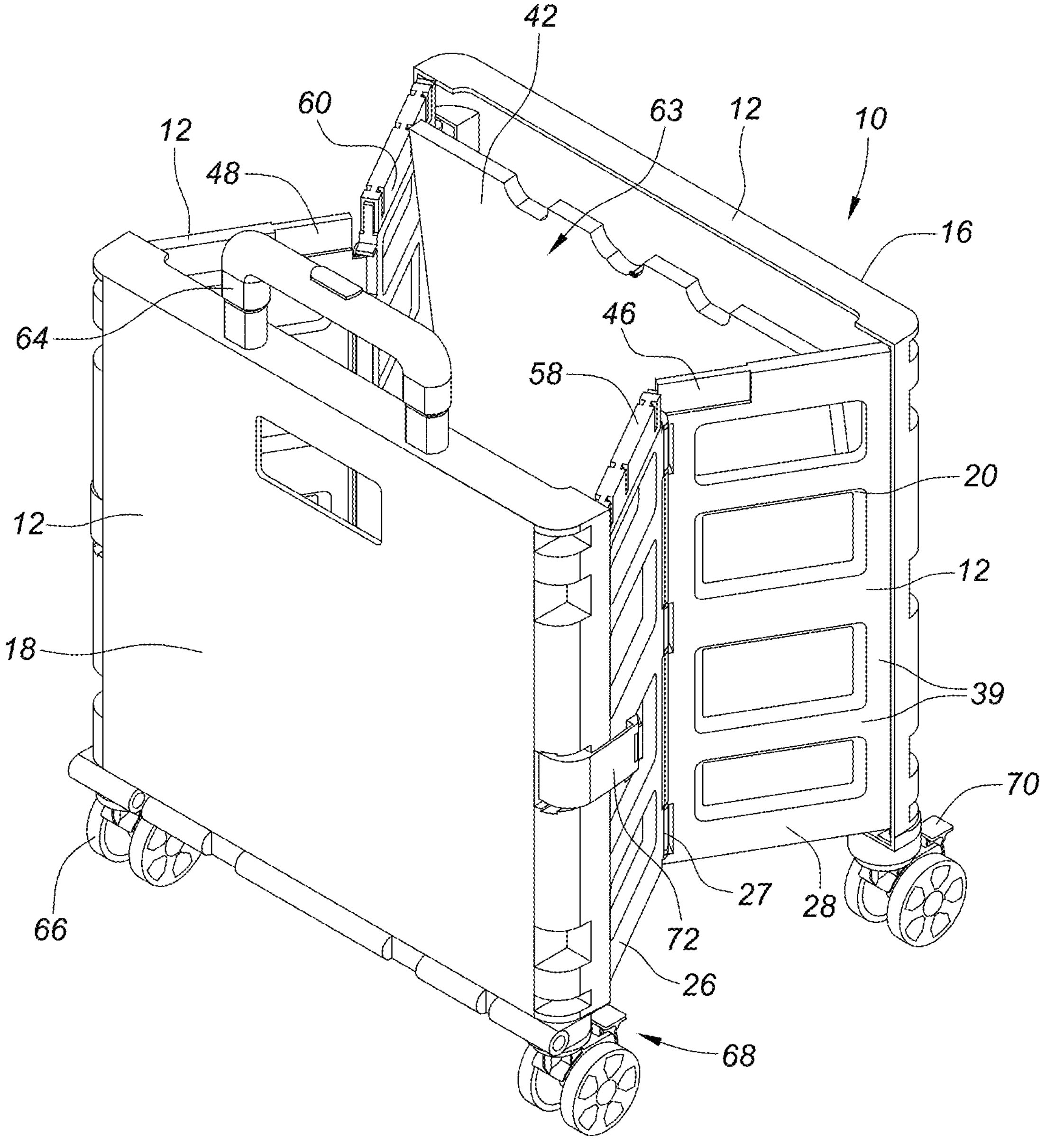
FIG. 8 is a perspective view of the collapsible cart of FIG. 1 illustrated with the sidewalls folded inwardly, according to an embodiment.
Figure 9:
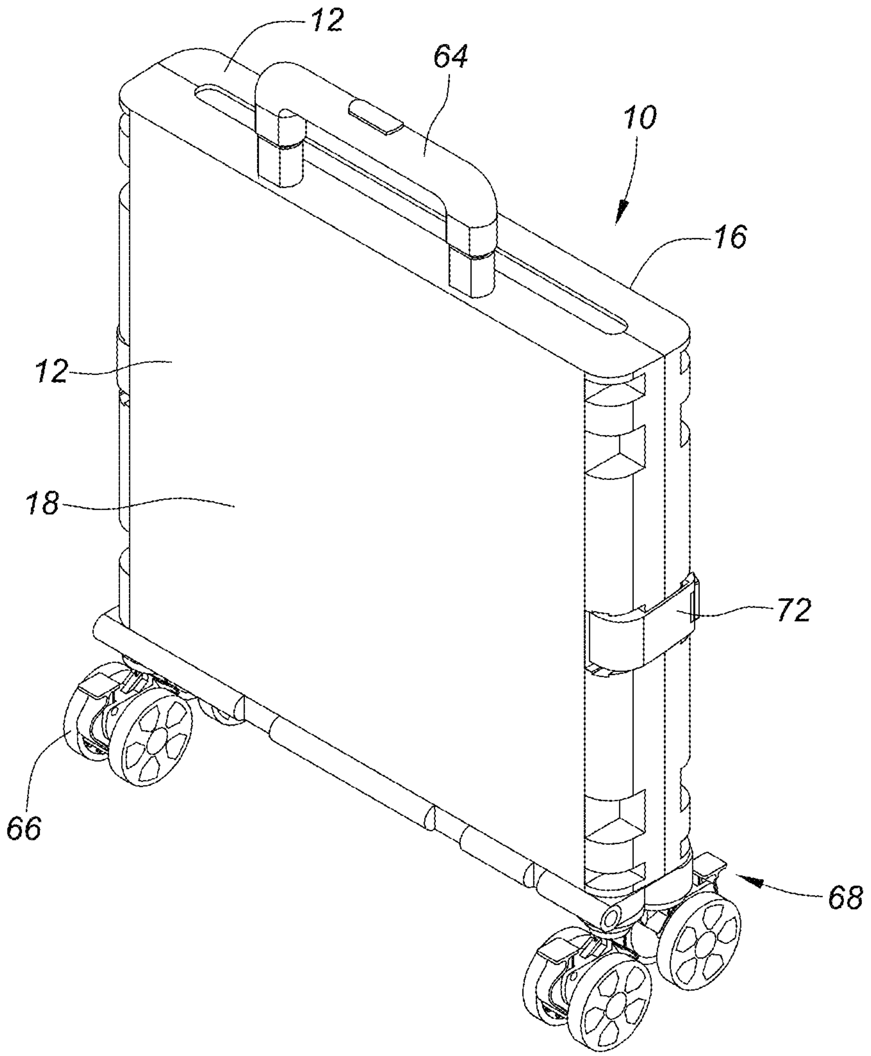
FIG. 9 is a perspective view of the collapsible cart of FIG. 1 illustrated in a closed condition, according to an embodiment.
Figure 10:
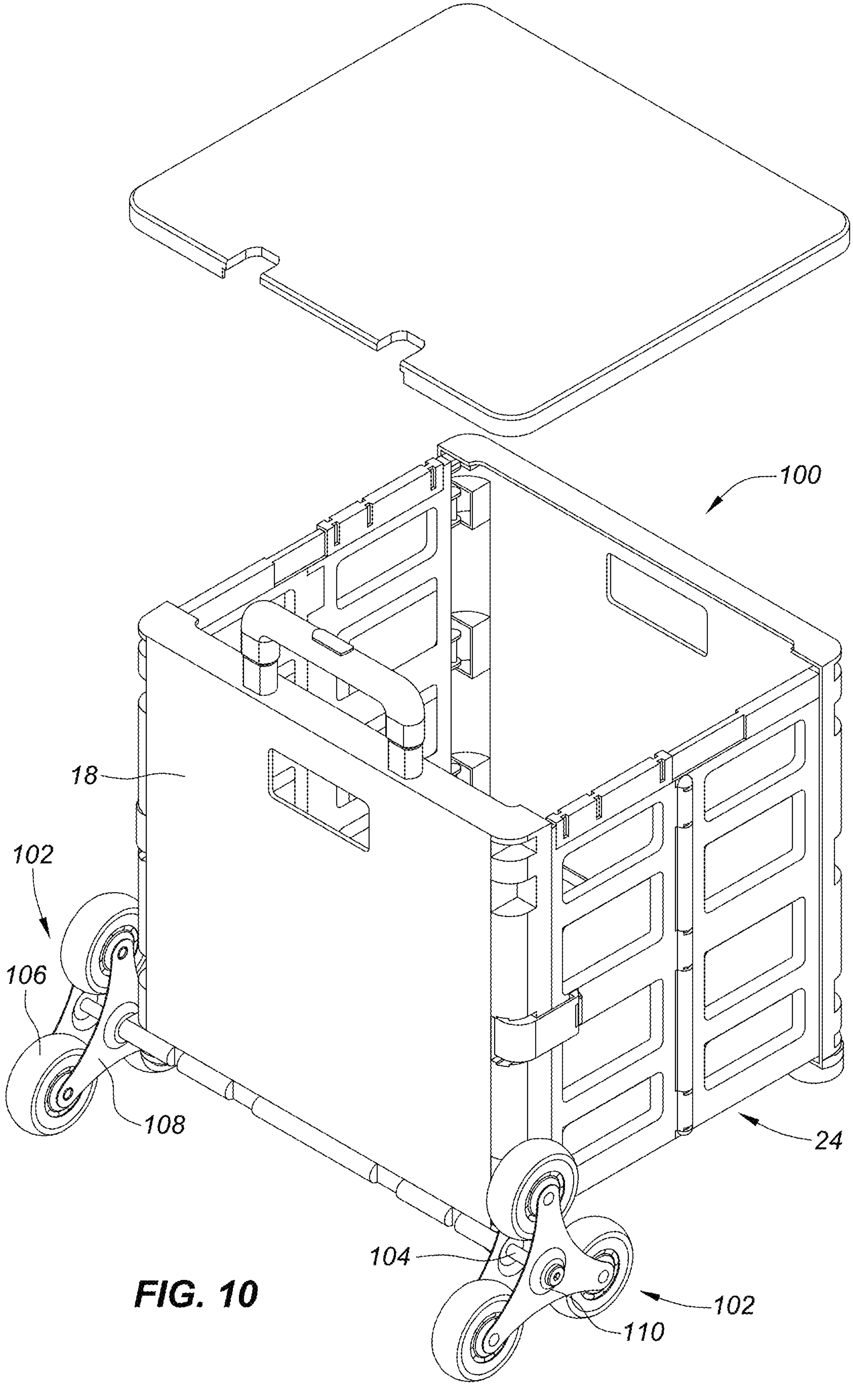
FIG. 10 is a perspective view of a collapsible cart illustrated in an open condition, according to an embodiment.
Figure 11:
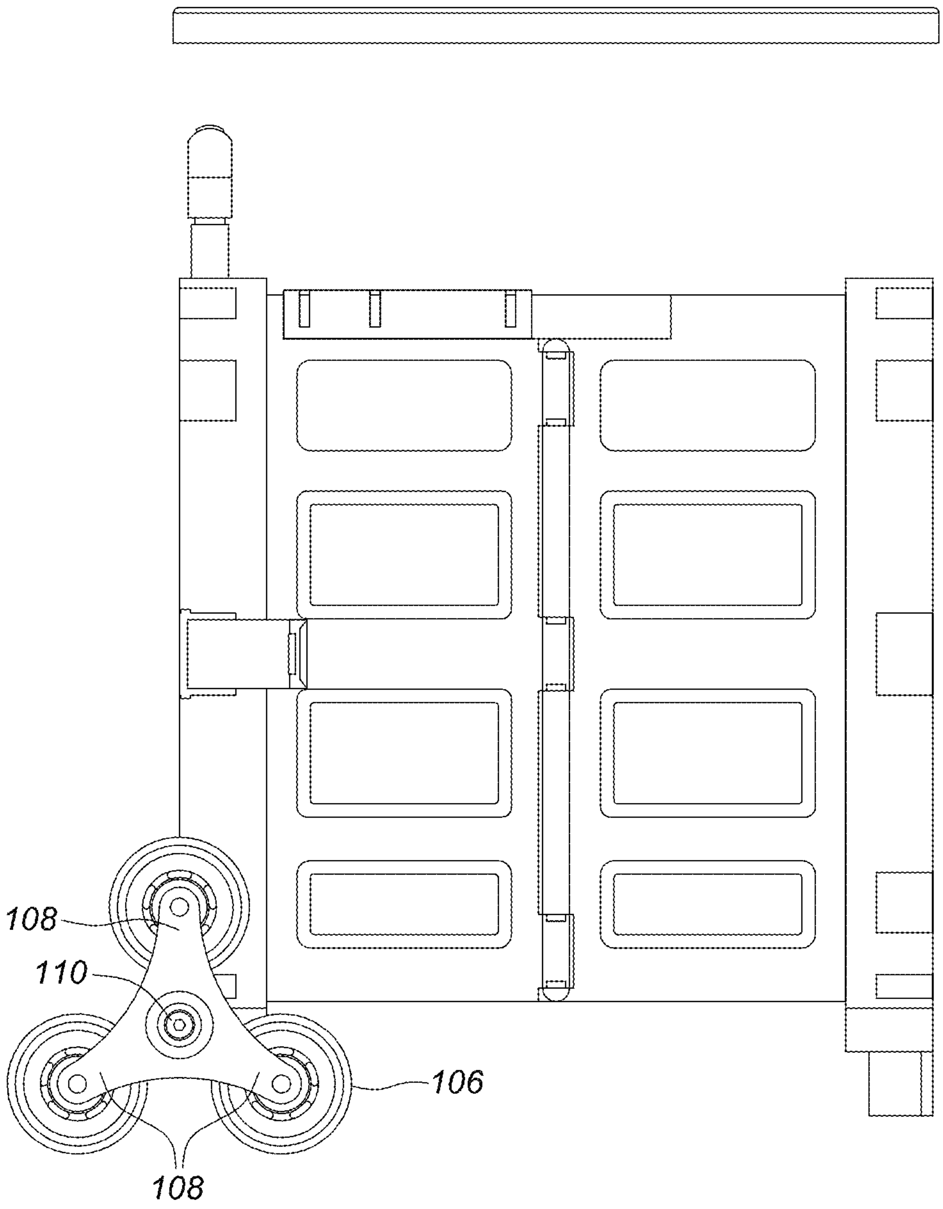
FIG. 11 is a right side view of the collapsible cart of FIG. 10, according to an embodiment.
Figure 12:
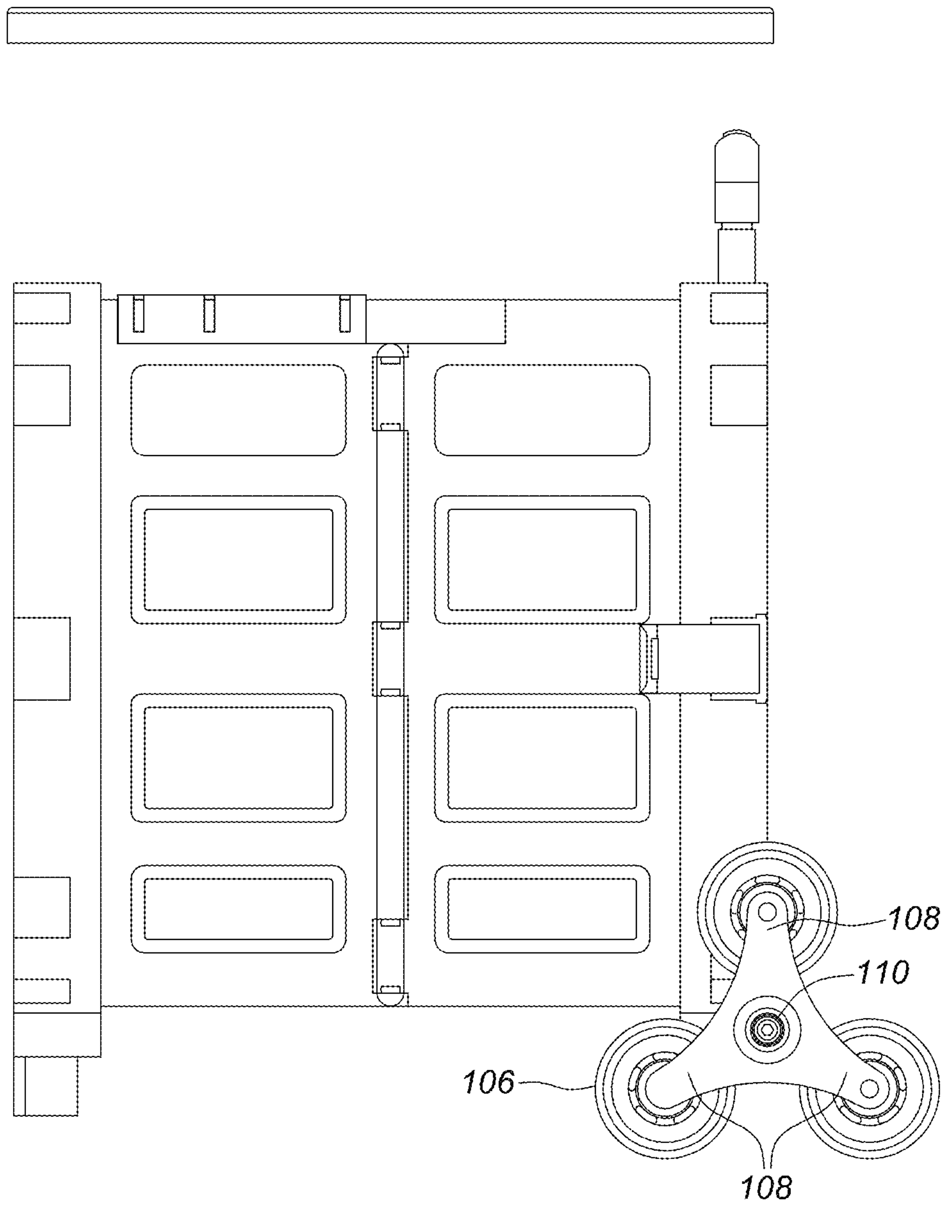
FIG. 12 is a left side view of the collapsible cart of FIG. 10, according to an embodiment.
Figure 13:
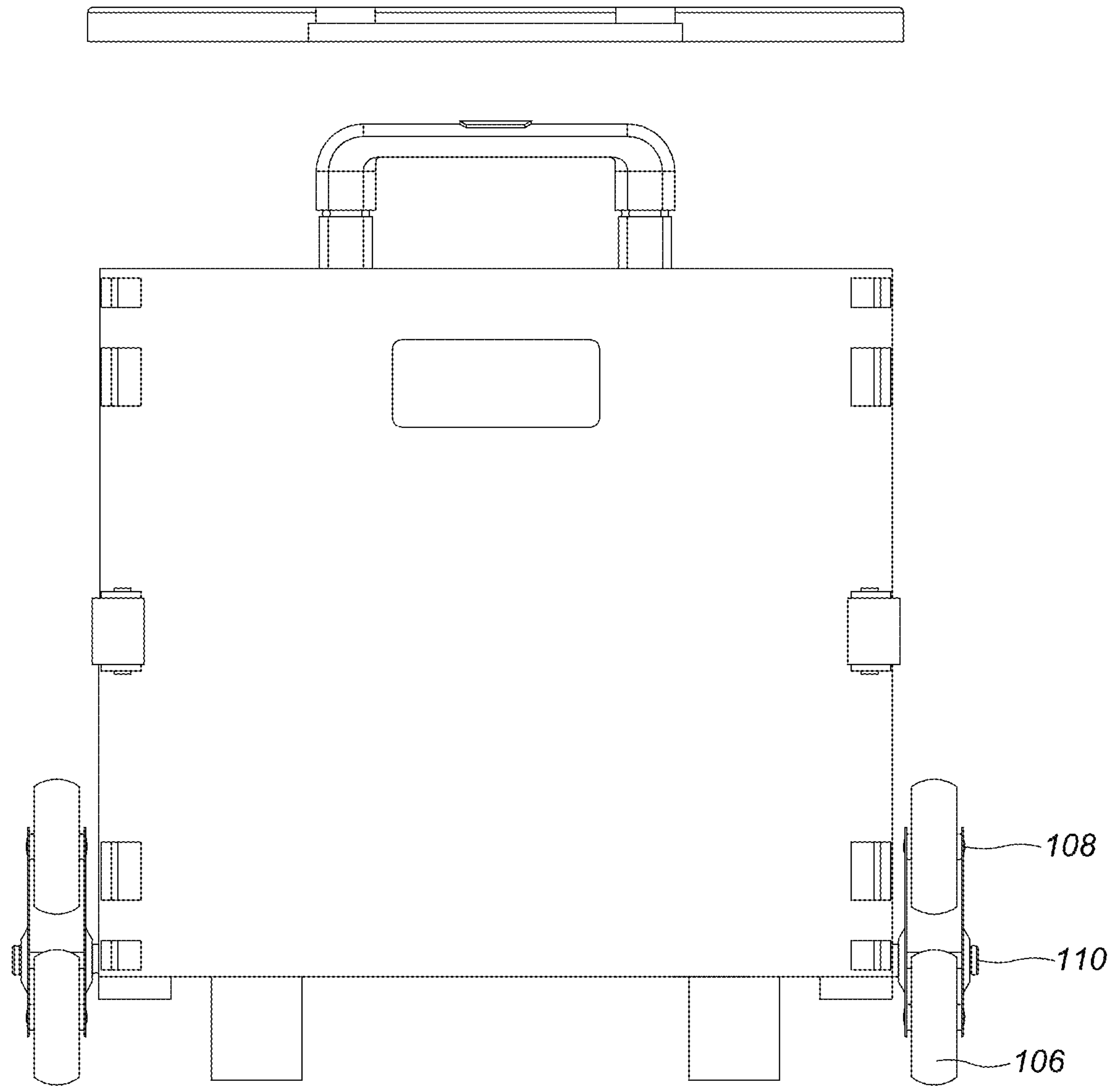
FIG. 13 is a front plan view of the collapsible cart of FIG. 10, according to an embodiment.
Figure 14:
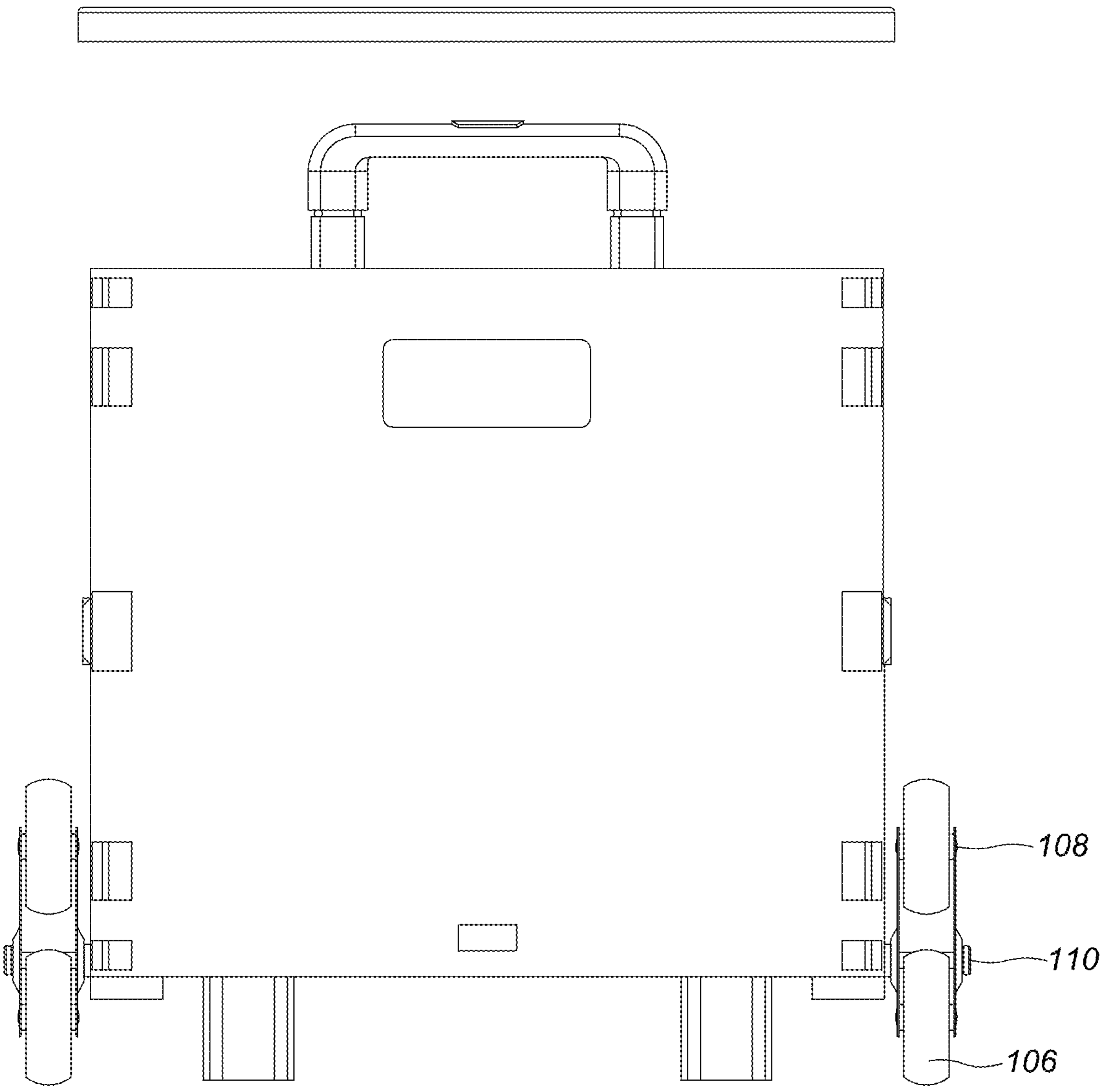
FIG. 14 is a rear plan view of the collapsible cart of FIG. 10, according to an embodiment.
Figure 15:
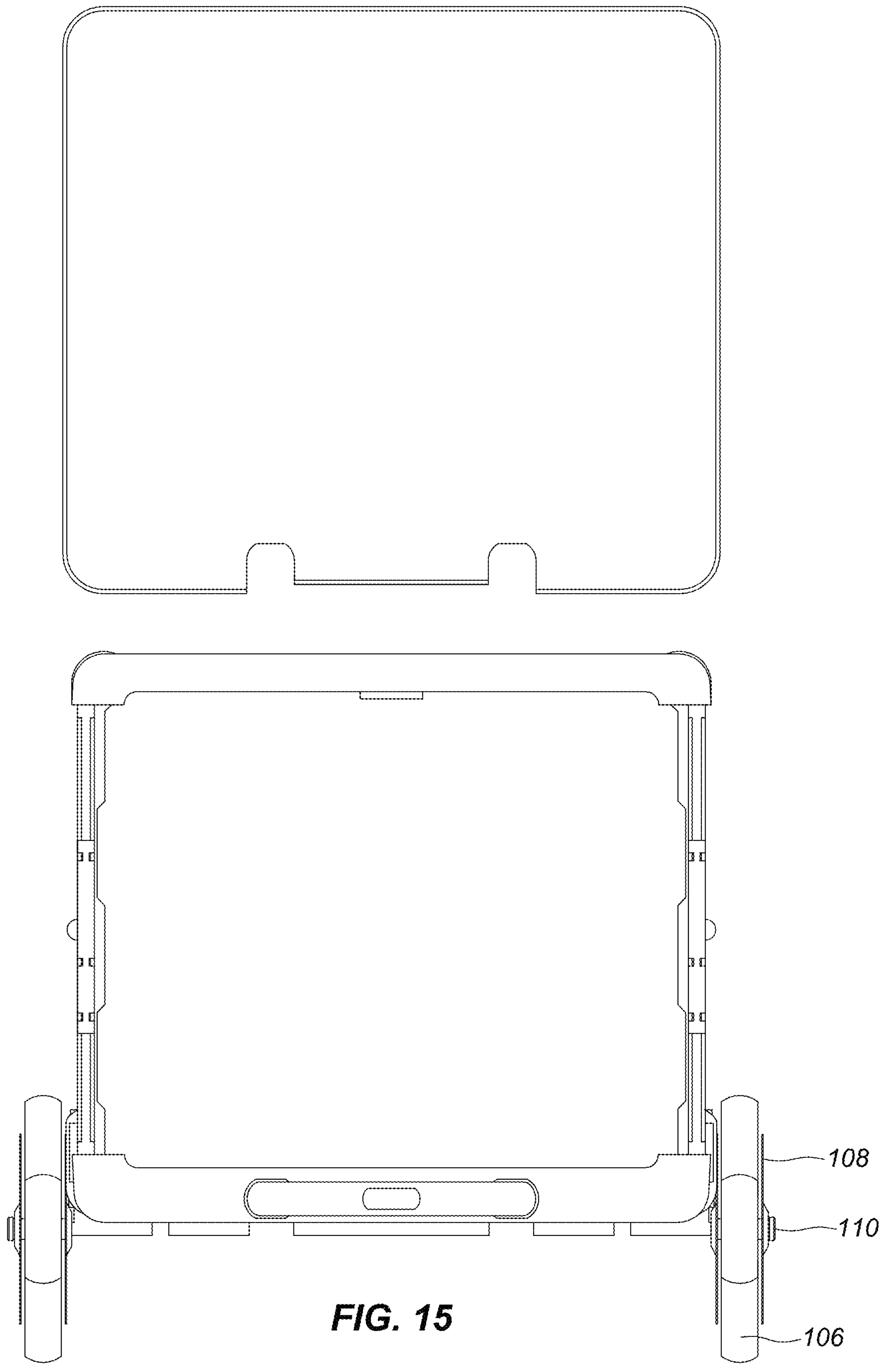
FIG. 15 is a top view of the collapsible cart of FIG. 10, according to an embodiment.
Figure 16:
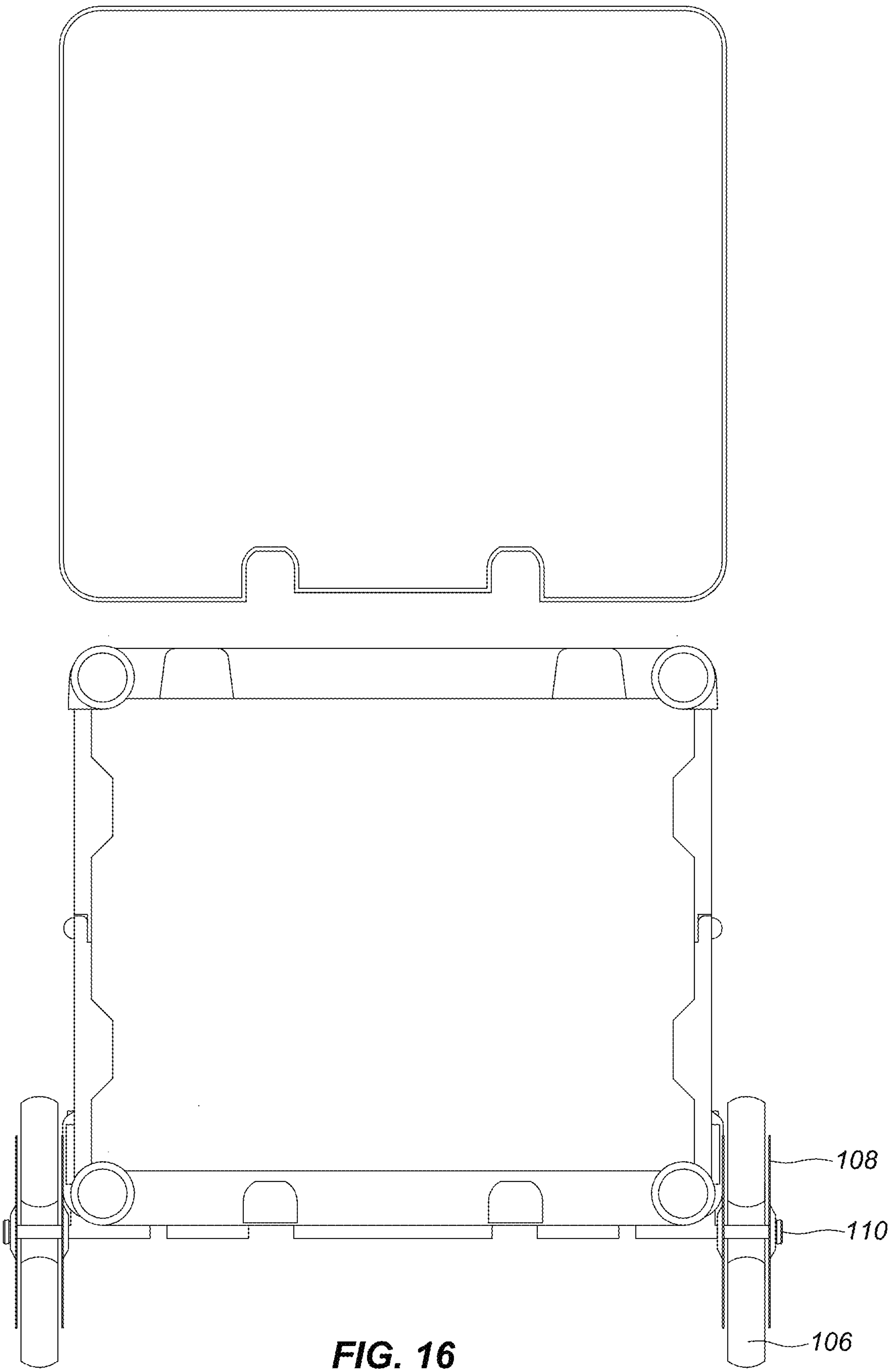
FIG. 16 is a bottom view of the collapsible cart of FIG. 10, according to an embodiment.
Figure 17:
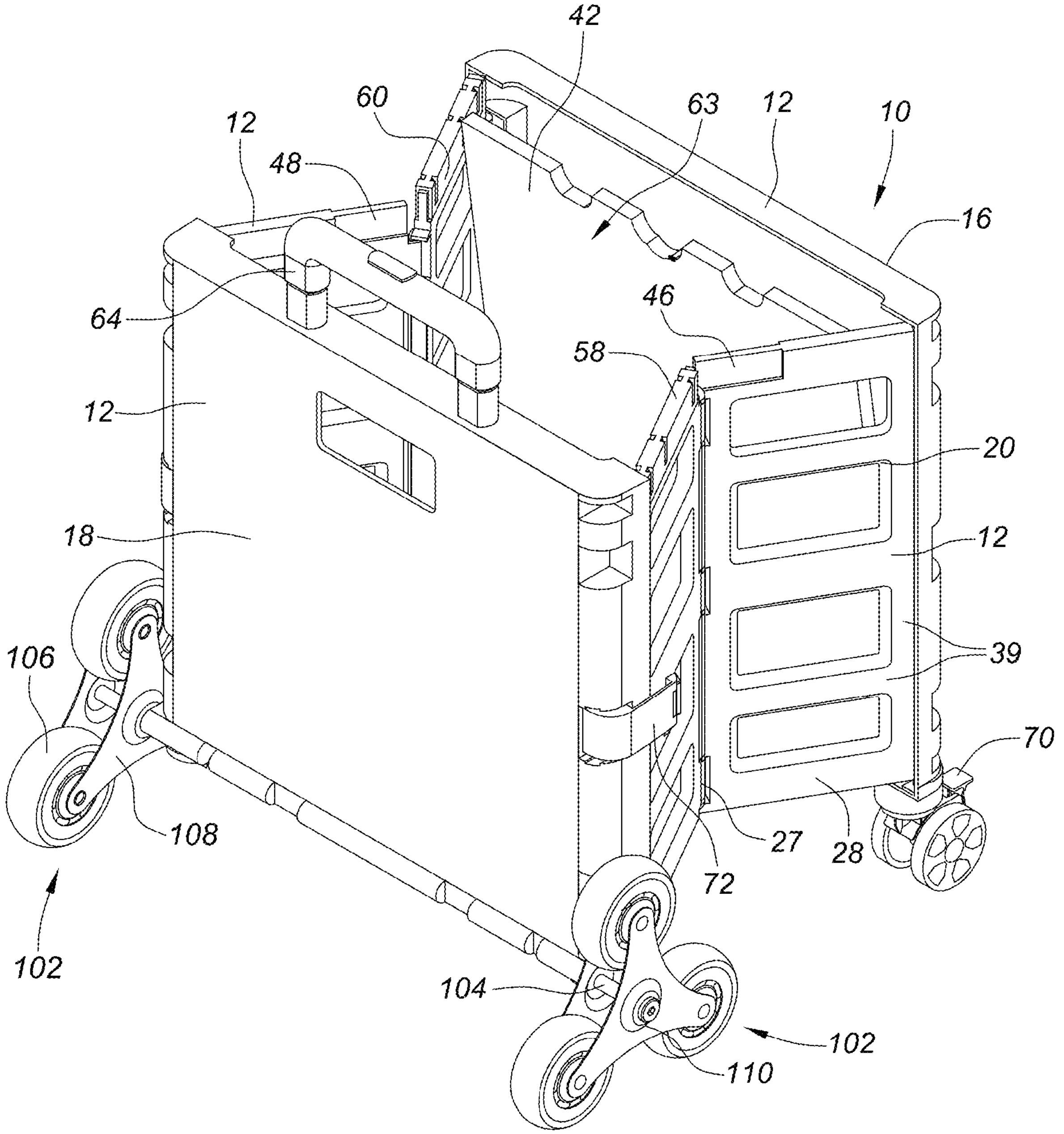
FIG. 17 is a perspective view of the collapsible cart of FIG. 10 illustrated with the sidewalls folded inwardly, according to an embodiment.
Figure 18:
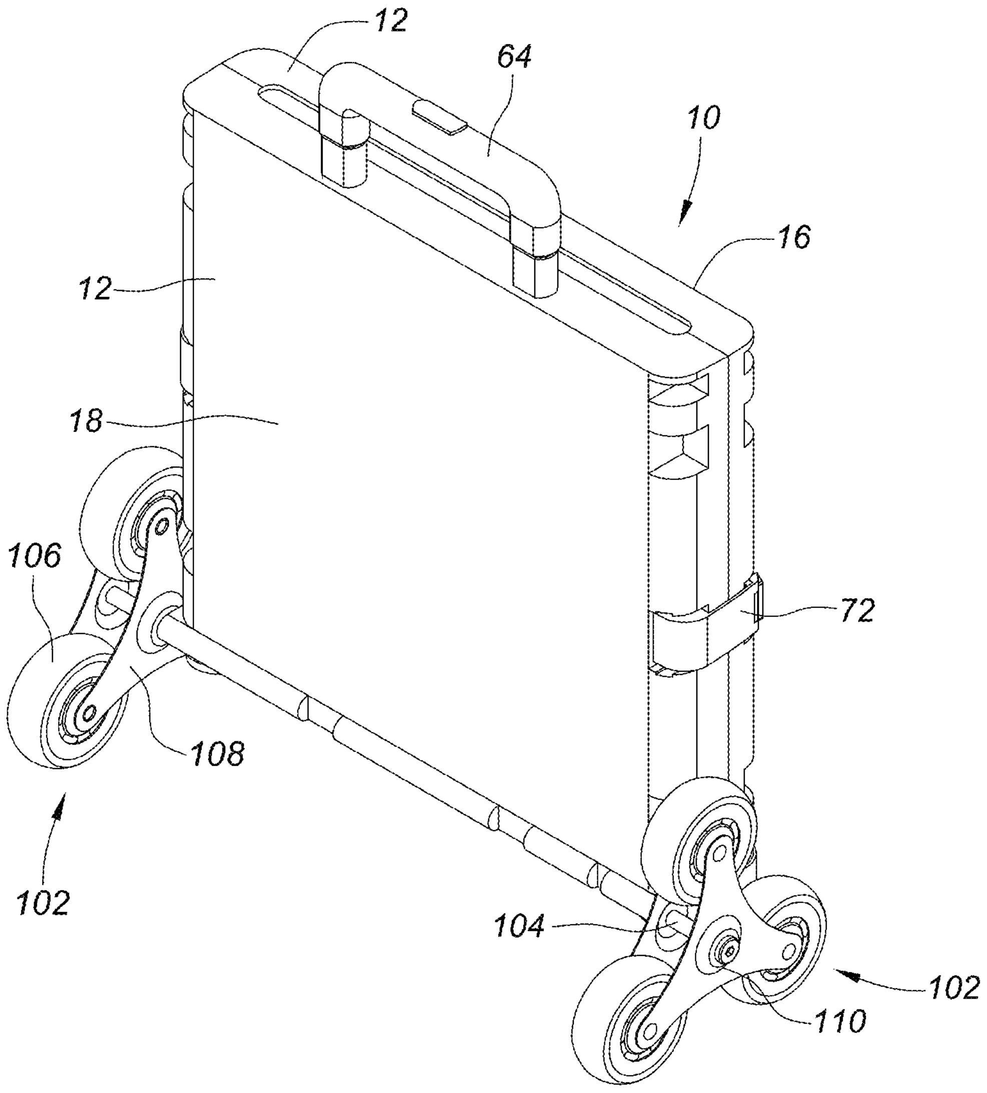
FIG. 18 is a perspective view of the collapsible cart of FIG. 10 illustrated in a closed condition, according to an embodiment.
Figure 19:
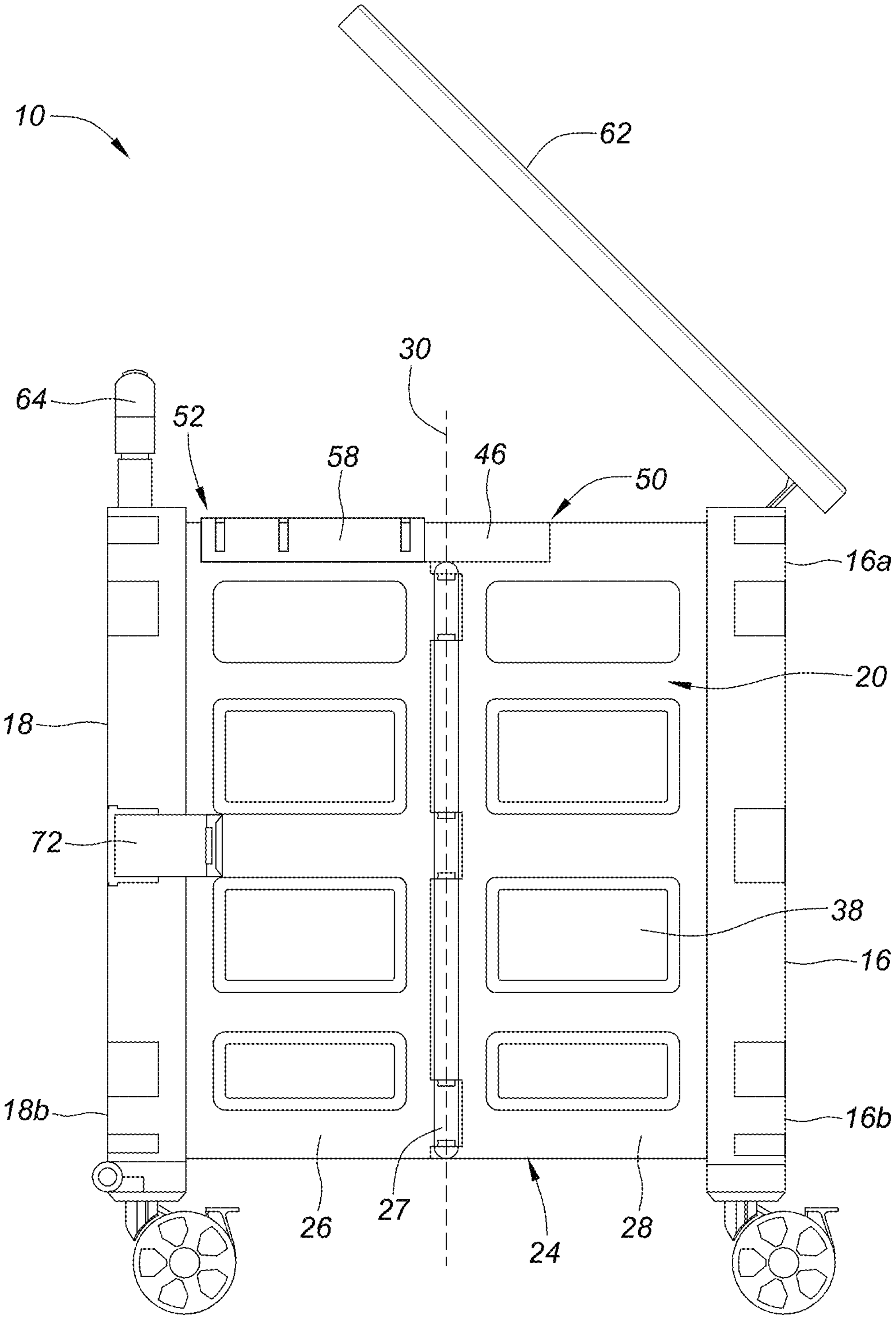
FIG. 19 is a right side view of the collapsible cart similar to FIG. 1 now illustrating a new embodiment having the rigid cover panel pivoting in a first axis by a hinge mechanism that connects the cover panel to the front wall.

FIG. 19 illustrates this new embodiment of the present invention. The collapsible cart 10 is very similar to the previous embodiments already disclosed, such that common reference numbers are used herein. Similarly, the rigid frame 12 forms the compartment 14. The rigid frame includes the front wall 16, the rear wall 18, the right sidewall 20, the left sidewall 22, and the pivotable base panel 40. The pivotable base panel is pivotably connected to a bottom 16*b* of the front wall or a bottom 18*b* of the rear wall. The pivotable base panel still has a lower surface 42 opposite an upper surface 44, where the upper surface forms a bottom floor of the compartment. The pivotable base panel is configured to pivot between being disposed parallel to the front wall and rear wall for storage (as shown in FIG. 8) or being disposed perpendicular to the front wall and the rear wall when in use forming the bottom floor of the compartment (as shown in FIG. 1). As with previous embodiments, the right sidewall and the left sidewall are configured to fold inwardly into the compartment allowing the cart to collapse for storage.

Figure 23:
FIG. 23 is a view similar to FIG. 21 and FIG. 22 now showing the rigid cover panel further rotating in a second axis.

The rigid cover panel 62 still conforms in shape to a top opening 63 of the compartment as the rigid cover panel is configured to securely fit in a first position over the top opening to serve as a cover and/or a seat as shown in FIG. 1. However, as now shown in FIG. 19, the rigid cover panel is movably attached to a top 16*a* of the front wall. The rigid cover panel is configured to be moved to a second position residing adjacent the front wall outside the compartment as best shown in FIG. 23.

Figure 20:
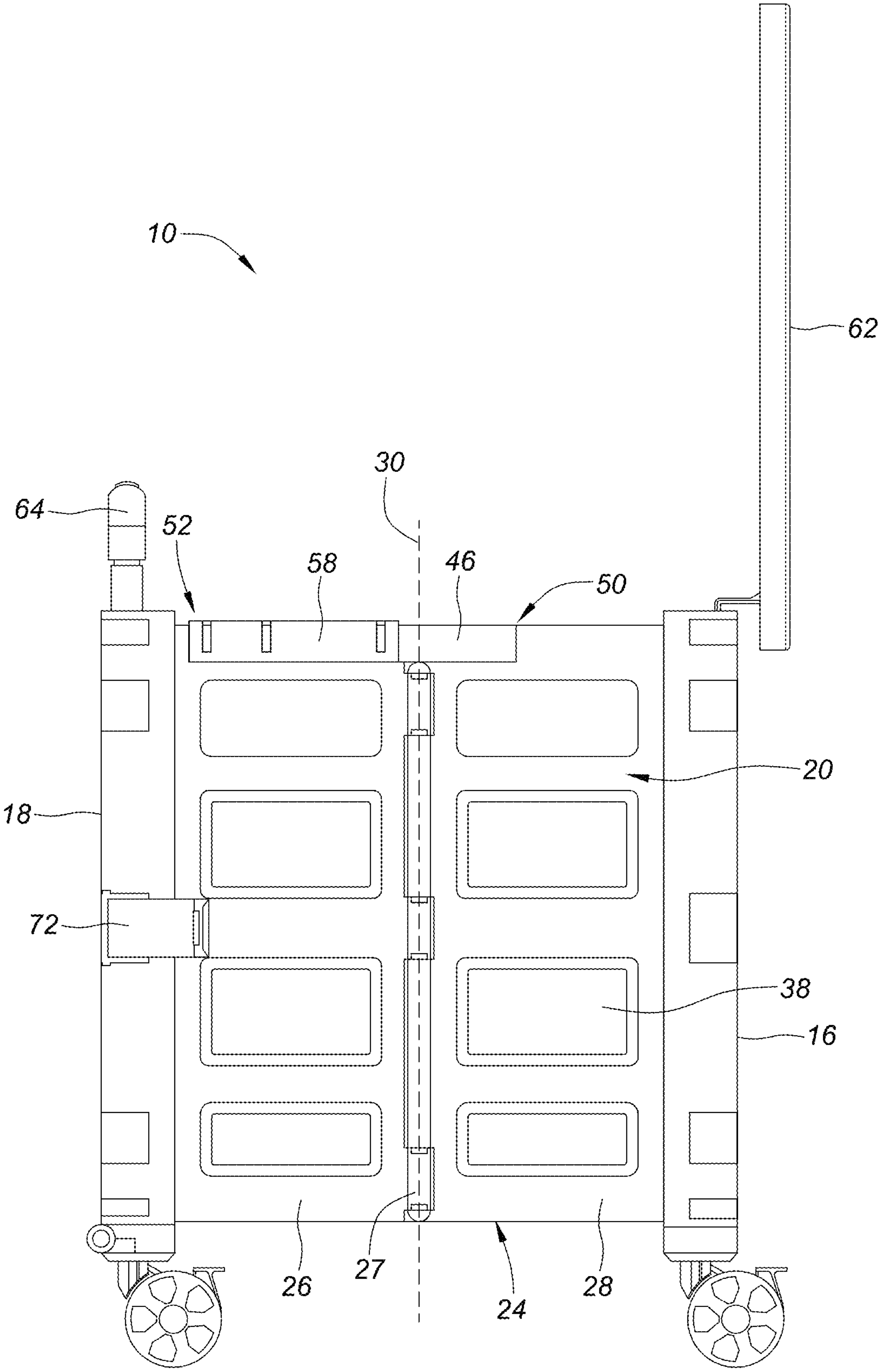
FIG. 20 is a view similar to FIG. 19 now showing the rigid cover panel in a vertical orientation.
Figure 21:
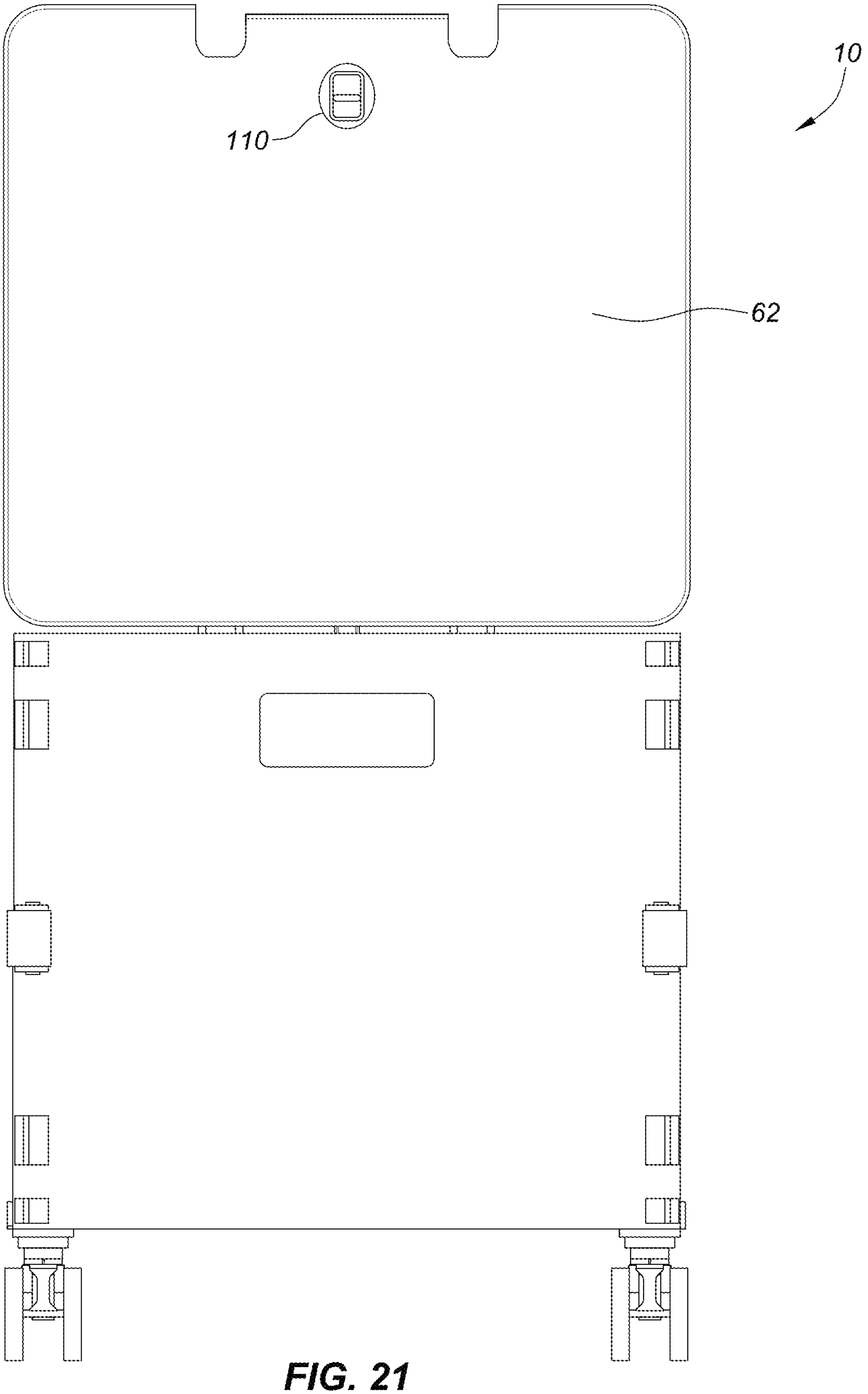
FIG. 21 is a front plan view of the structure of FIG. 19.
Figure 22:
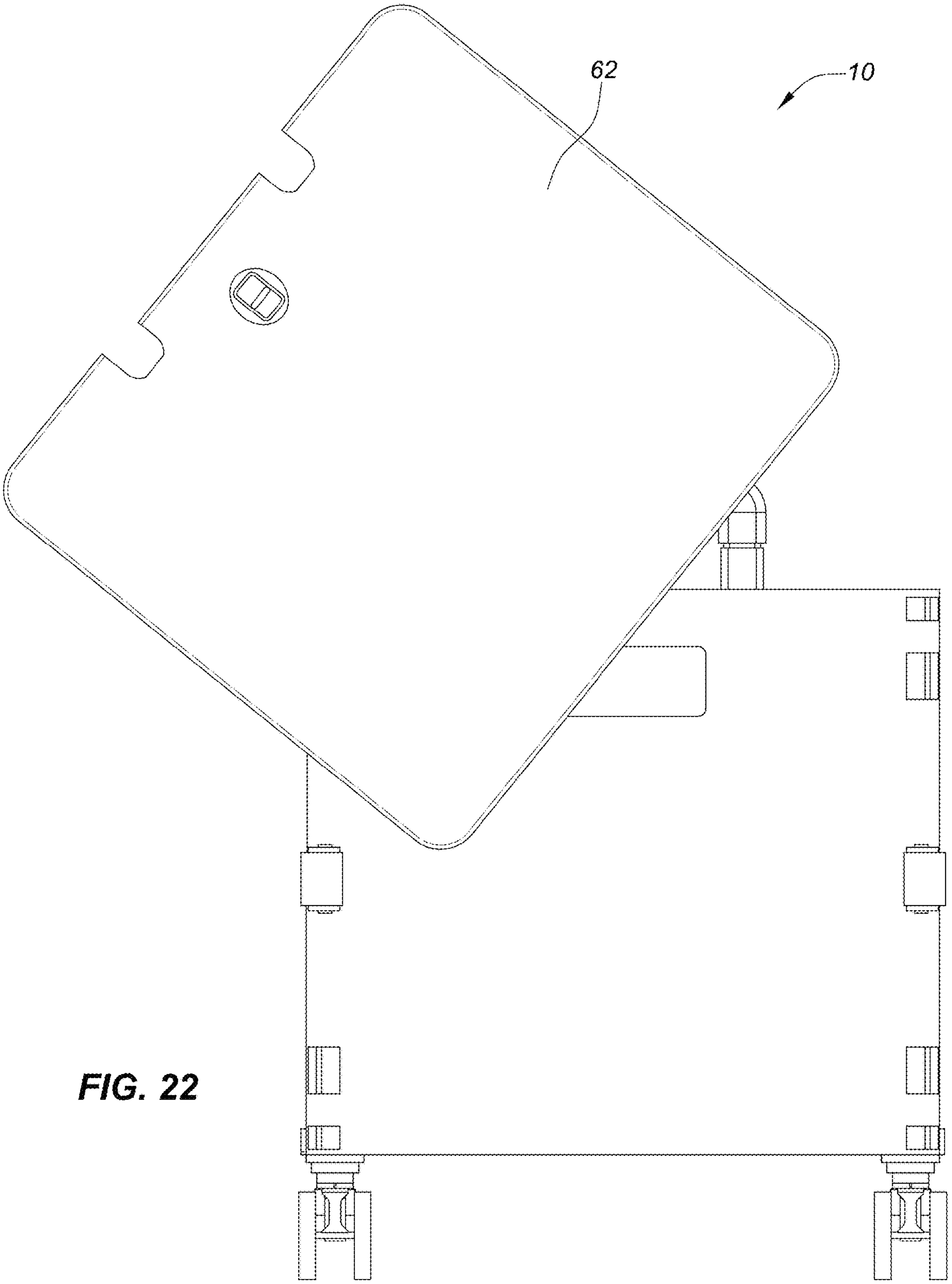
FIG. 22 is a view similar to FIG. 21 now showing the rigid cover panel rotating in a second axis.
Figure 24:
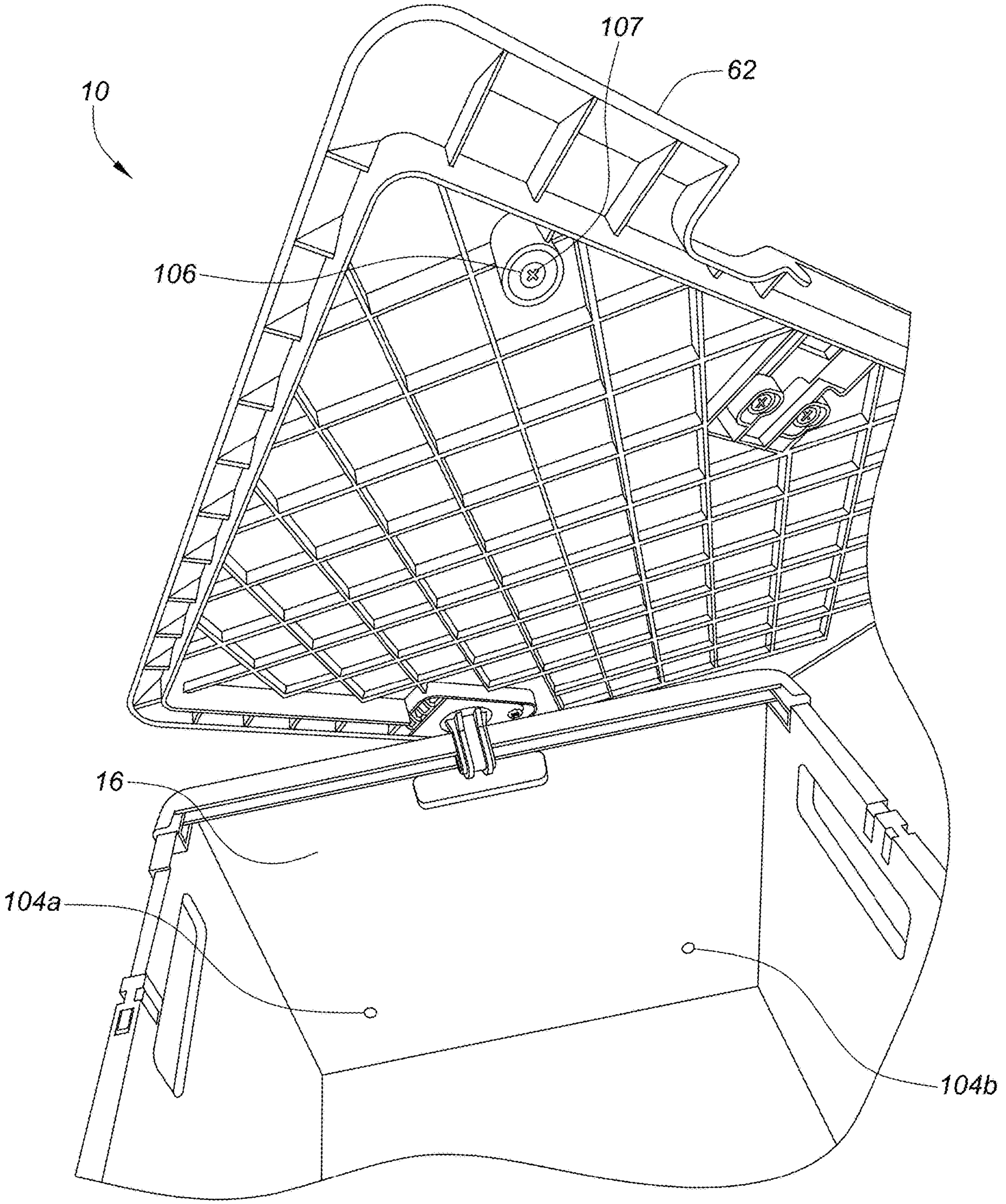
FIG. 24 is a perspective view showing the magnets and washers disposed inside the collapsible cart.
Figure 25:
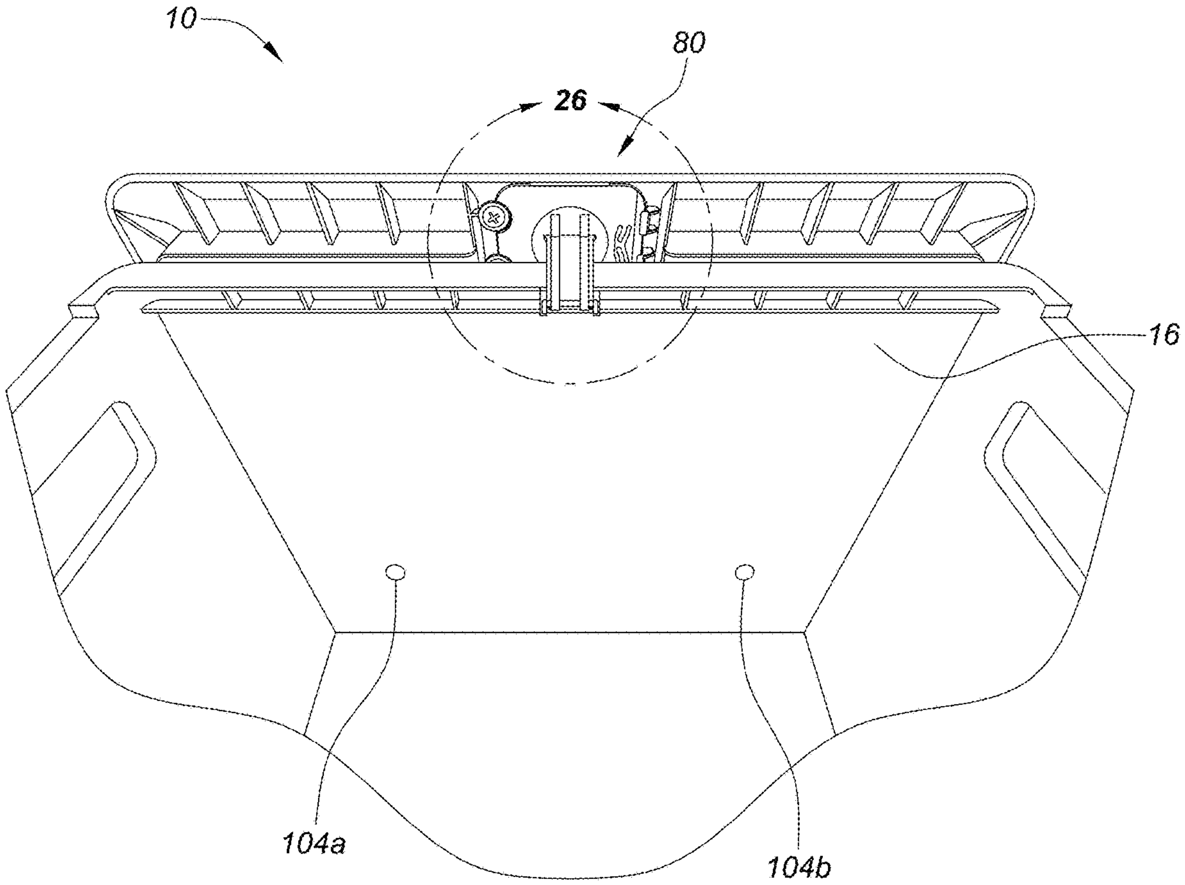
FIG. 25 is a perspective view showing the hinge mechanism of FIGS. 20-24.
Figure 26:
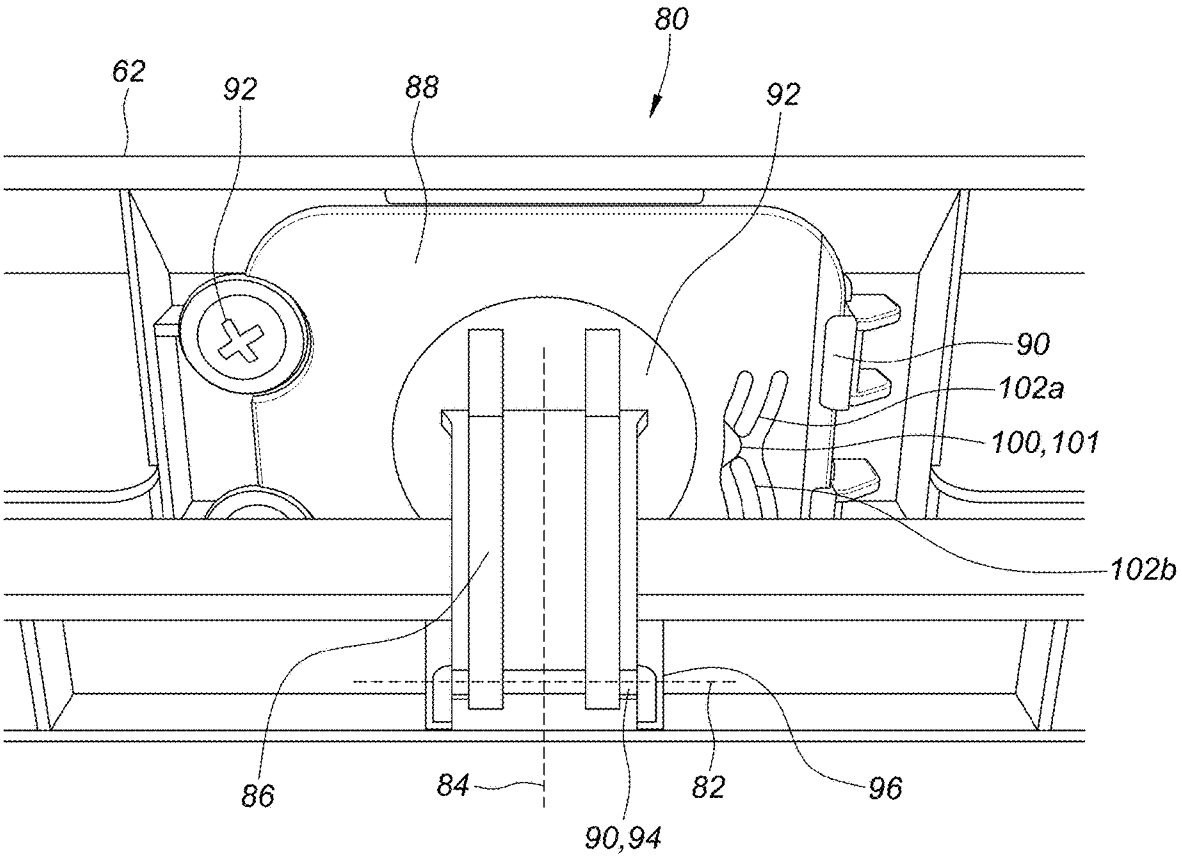
FIG. 26 is an enlarged view taken along line 26 of FIG. 25.

FIG. 19 shows the rigid cover panel 62 starting to pivot upwards about a first axis 82 and then FIG. 20 shows the rigid cover panel in a vertical orientation. FIG. 21 is a front view of the FIG. 20. The cover panel 62 is able to pivot upwards due to a novel hinge mechanism 80 which is best shown in FIGS. 24, 25 and 26. FIG. 26 is a close up of the hinge mechanism taken from FIG. 25.

FIG. 26 shows that the hinge mechanism can pivot in both the first axis 82 and also a second axis 84. The first axis and second axis are perpendicular to one another. Accordingly, the cover panel first pivots about the first axis 82 in FIGS. 19-21. Then, in FIG. 22, the cover panel rotates about the second axis 84 and continues to rotate in FIG. 23. As shown in FIG. 23, the cover panel is positioned out of the way of the compartment such that it is easy to place and remove items from the compartment. Yet, the cover panel will no longer be lost or unavailable as it is permanently connected to the front wall 16.

The hinge mechanism shown in FIG. 26 comprises a first portion 86 and a second portion 88. The first portion is able to rotate about the second axis 84 in relationship to the second portion 88. In this embodiment, the hinge mechanism comprises two parts, but could comprise one part or any number of parts to achieve the multi-axis movement and shown and described herein.

The first portion of the hinge at a proximal end 90 is pivotably connected to the top of the front wall. In this case, it is attached on the inside of the front wall but could be attached to the outside as well. In this embodiment, the proximal end 90 has cylindrical extensions 94 that are configured to snap into circular recesses 96 formed into the front wall. Thus, the cylindrical extensions are able to pivot within the circular recesses. It is understood that other devices or structures could achieve the same movements, such an auxiliary pin used for an axle that would extend through both the front wall and the proximal end of the front part. Accordingly, this teaching is not to be limited to the precise form shown and described herein.

The second portion of the hinge is connected at a distal end 92 to the cover panel 62 through the use of clips 90 and fasteners 92. As is understood by those skilled in the art, the second portion 88 could be connected to the cover panel 62 through any combination of clips and/or fasteners and/or bonding agents (not shown). Furthermore, the second portion 88 could be formed as part of the cover panel 62 when the cover panel is injection molded during production.

In another embodiment not shown, the hinge mechanism could be replaced with a fabric strap where the fabric strap is inherently flexible to allow the multi-axis movement required.

Once the cover panel is in the open position as shown in FIG. 26, it may swing back and forth undesirably as the cart is moved around. Thus, the inventors have further improved the novel hinge mechanism with a cam and flexure mechanism. A raised bump 100 is formed as part of a cam 101 that is made as part of the first portion 86 or attached to the first portion 86. The cam 101 is generally circular in shape except for the raised bump 100. The cam is generally hidden from view as being disposed behind the second portion 88, but the raised bump 100 can be seen through the hole of the flexure 102 formed in the second portion 88. Here, two flexures 102*a* and 102*b* are formed, but one flexure could have been used. The flexures abut the raised bump and create an interference fit that helps hold the cover panel into location once the raised bump is disposed between the two flexures. To move the cover panel out of the position, the raised bump engages at least one flexure and causes it to deflect a small distance which in turn creates a resistance to movement and a resistance for swinging back and forth. As is understood by those skilled in the art, a number of different cam and flexure mechanisms are possible, as this teaching is not to be limited to the precise form described herein.

There is also another solution that can be added to the previous solution or used in lieu of the previous solution to prevent or reduce the cover panel from swinging undesirably back and forth. Referring now to FIG. 24, magnets 104*a* and 104*b* can be disposed as part of the front wall 16. Then, additional magnets or ferromagnetic material, such as metal washers 106, can be attached to the inside surface of the cover panel 62. When the cover panel is used to close the top of the cart, the magnets 104 and washers 106 are far apart. Yet, when the cover panel is opened and disposed as shown in FIG. 26, they are appropriately positioned such that they align with one another. Therefore, a magnetic attraction occurs between the magnets and washers that keeps the cover panel in its position relative to the cart and prevents or reduces the undesirable swinging.

It is shown in FIG. 24 that the washers 106 are held with fasteners 107, but they could also be bonded into place or securely held through an interference fit. Likewise, the magnets 104 can be screwed, bonded or held in place with an interference fit. The magnets 104 could be placed on either the outside of the front wall or on the inside of the front wall. Here, the magnets are shown in the inside of the front wall.

The rigid cover panel may also include a locking mechanism 110 configured to lock or unlock the rigid cover panel in the first position. The locking mechanism can be a switch that can be slid forwards and backwards to engage the rear wall.

Figure 27:
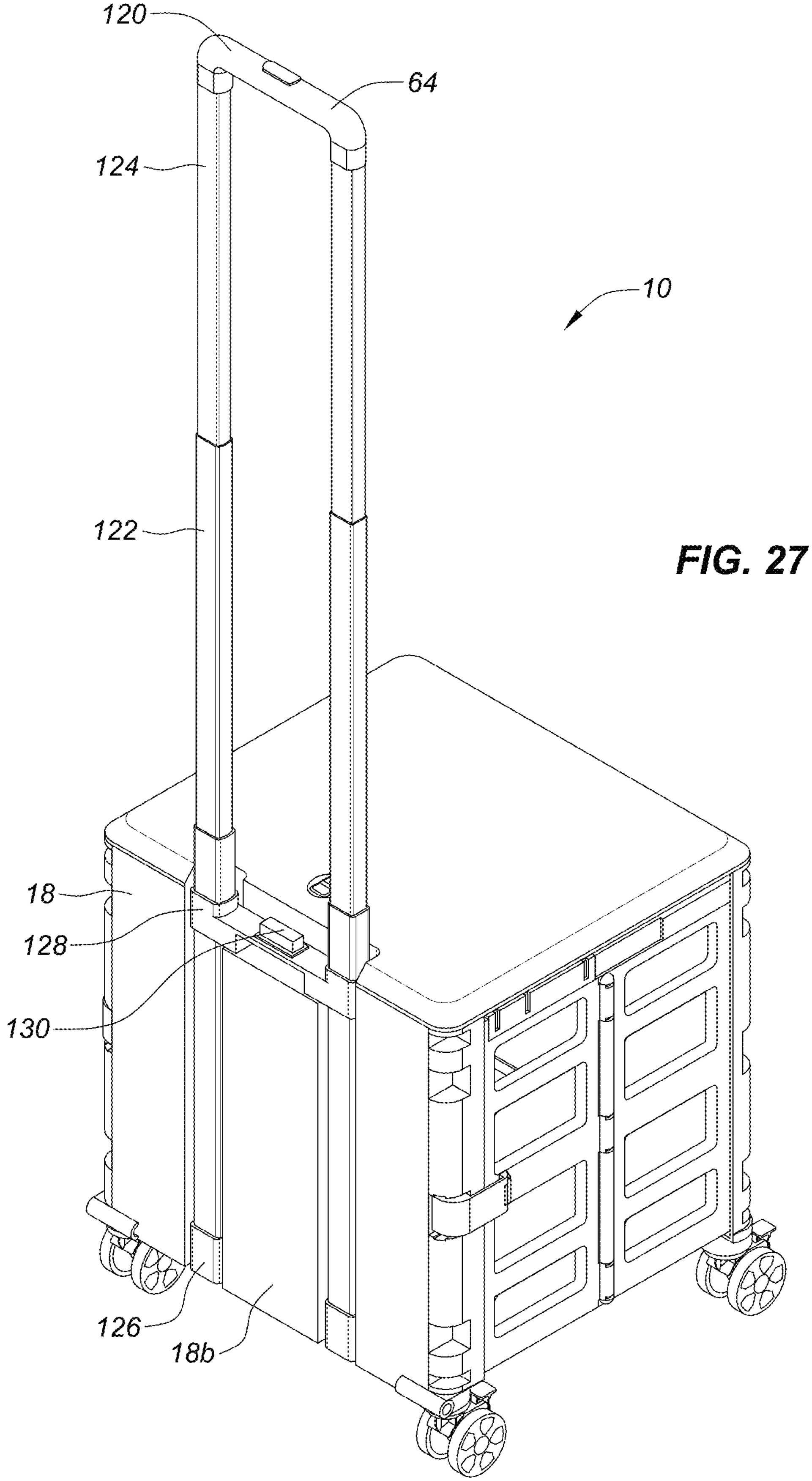
FIG. 27 is a perspective view of another embodiment of the collapsible cart now having a pivoting telescoping handle.
Figure 28:
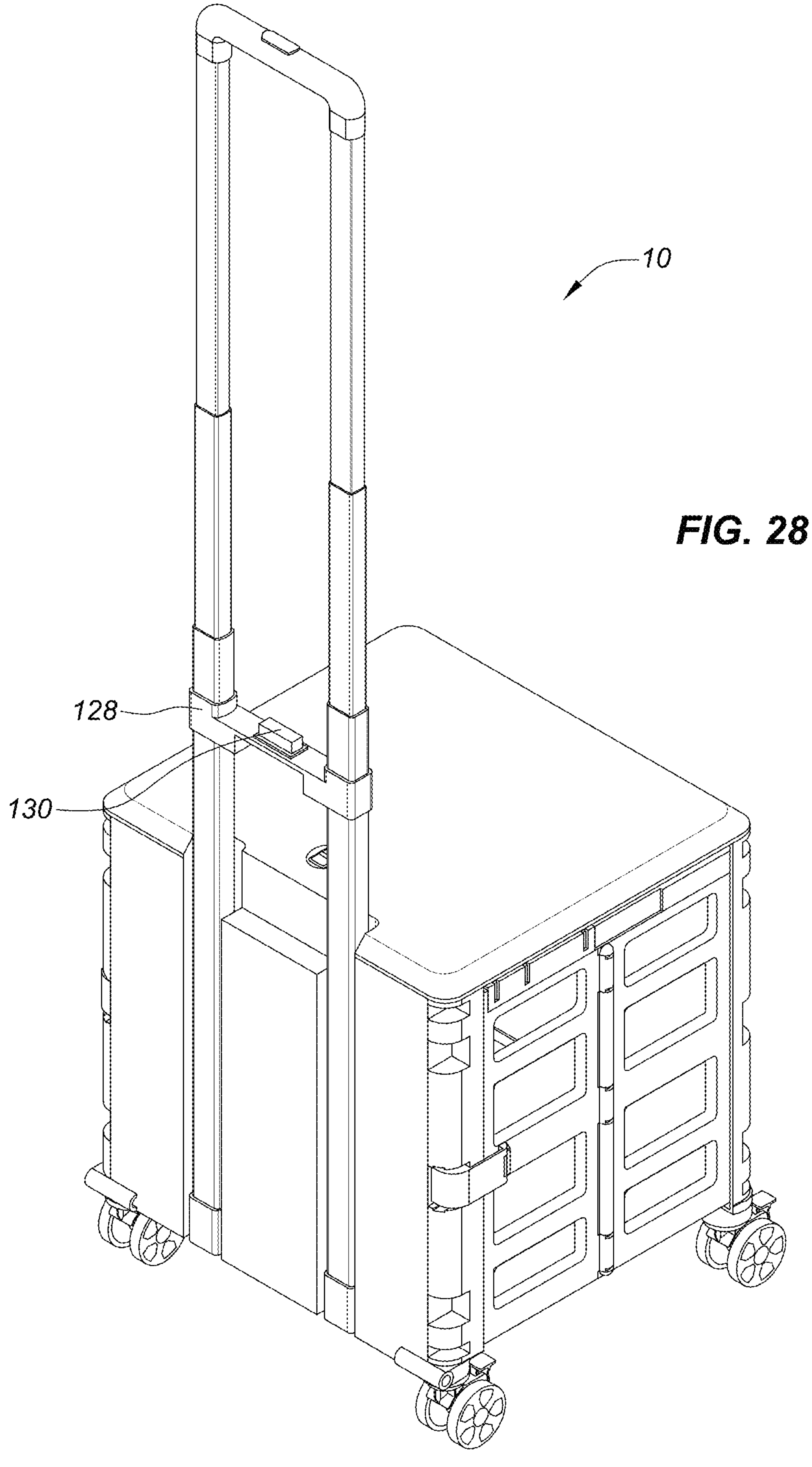
FIG. 28 is a view similar to FIG. 27 now showing a locking slide being moved upwards to unlock the telescoping handle relative to the rear wall of the cart.
Figure 29:
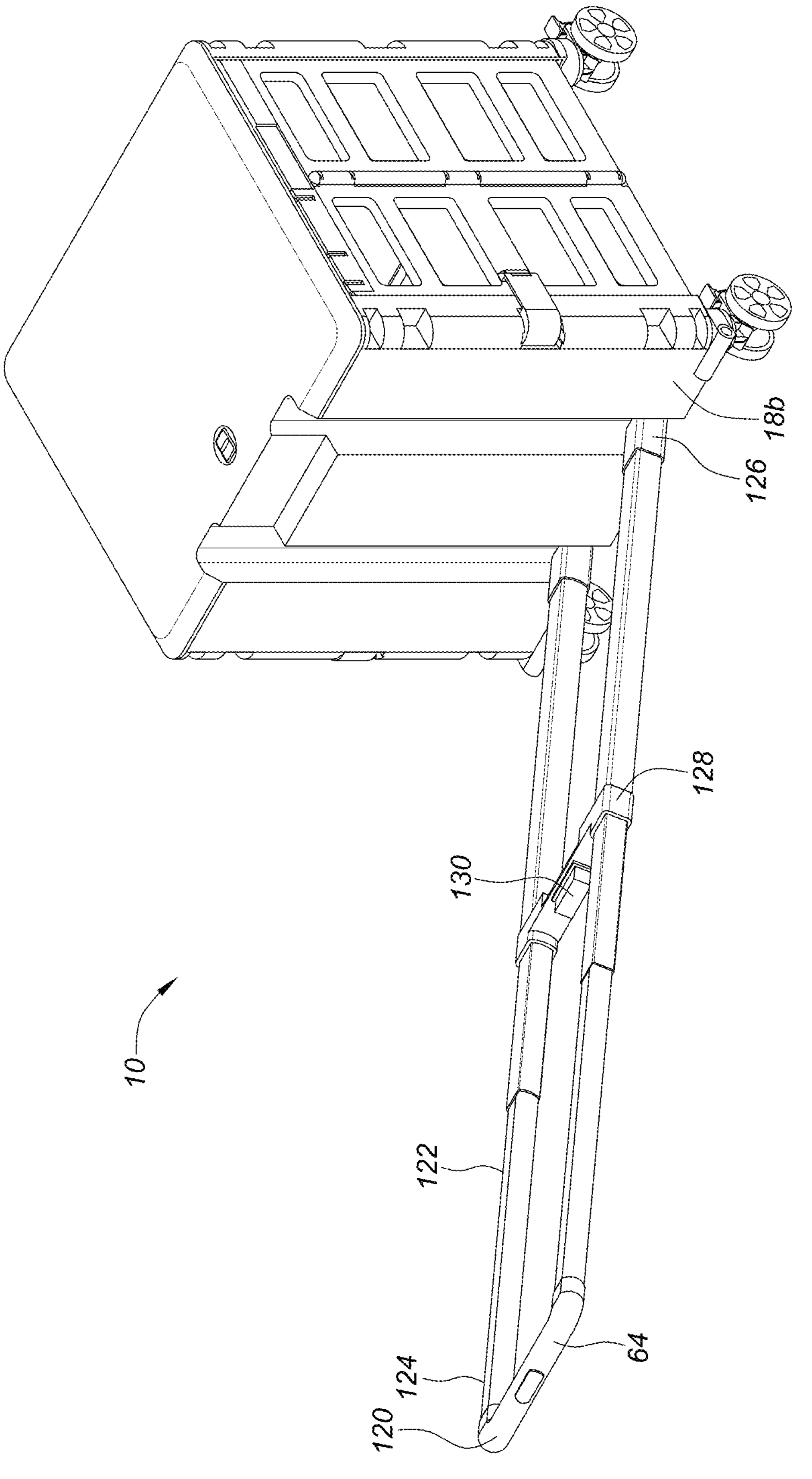
FIG. 29 is a perspective view of the structure of FIGS. 27-28 now showing how the telescoping handle can pivot at its proximal end for rolling the cart while allowing all four wheels to remain in contact with the ground.

FIGS. 27-29 illustrate yet another embodiment of the present invention. The collapsible cart 10 is very similar to the previous embodiments already disclosed, such that common reference numbers are used herein. The retractable handle mechanism 64 is disposed at, within or adjacent the back wall 18 as best shown in FIG. 27. The retractable handle mechanism 64 comprises a hand grip 120 attached to a telescoping assembly 122.

The hand grip is attached at a distal end 124 of the telescoping assembly.

Importantly, the telescoping assembly is pivotably attached at a proximal end 126 to the bottom 18*b* of the rear wall 18 as best seen in FIG. 28. There are a multitude of mechanism and methods that may be used by those skilled in the art to create the pivot joint at the proximal end of the telescoping assembly, as this teaching is not to be limited to any one specific structure.

A locking slide 128 is translatable along at least a portion of the telescoping assembly. The locking slide is a rigid structure that captures both of the telescoping tubes and helps secure them in parallel relationship. It is understood by those skilled in the art that just one telescoping tube could have been used and as such the locking slide would translate along this one telescoping tube.

In FIG. 27 the locking slide is locking the telescoping assembly to the rear wall at a distance apart from the proximal end which is pivotable. Then, in FIG. 28, the locking slide has moved upwards and no longer locks the telescoping assembly to the rear wall.

The locking slide is configured to lock to the rear wall securing the telescoping assembly parallel to the rear wall. Then, the locking slide is configured to unlock from the rear wall allowing the telescoping assembly to pivot at an angle away from the rear wall as shown in FIG. 28. A release button 130 is configured to lock and unlock the locking slide from the rear wall. As shown in FIG. 28, the collapsible cart 10 can now be rolled with all four wheels remaining on the ground while still retaining the functionality of the cart as described in the previous embodiments.

It is also understood by those skilled in the art that the locking slide could be replaced with a locking mechanism that either secures the telescoping assembly to the rear wall or allows the telescoping assembly to pivot about the proximal end. In other words, in other embodiments, the locking slide need not translate along the telescoping assembly while still being able to lock and unlock the telescoping assembly in relation to the rear wall.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the inventive aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this disclosure is not be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

Further, all claim terms should be interpreted in their most expansive forms so as to afford the applicant the broadest coverage legally permissible. Although the embodiments have been described with reference to the drawings and specific examples, it will readily be appreciated by those skilled in the art that many modifications and adaptations of the processes, methods and apparatuses described herein are possible without departure from the spirit and scope of the embodiments as claimed herein. Thus, it is to be clearly understood that this description is made only by way of example and not as a limitation on the scope of the embodiments as claimed below.

What is claimed is:

1. A collapsible cart configured to transition from a closed condition where it is folded up to an open condition where it is expanded for use, the collapsible cart comprising:

a rigid frame forming a compartment, the rigid frame comprising a front wall having a hole, a rear wall, a right sidewall, a left sidewall, and a pivotable base panel;

a lid adapted to be coupled to the front wall by hooking it to the hole in the front wall;

the right sidewall comprising a first right panel rotatably coupled to a second right panel;

a first track formed along the first right panel and the second right panel extending from a first position on the second right panel to a second position on the first right panel;

wherein the first track is formed to securely engage a slidable member such that the slidable member can slide along the first track between an open position to a closed position to selectively lock the first right panel to the second right panel, such that the slidable member is in the open position when adjacent the second position and not disposed along the second right panel, and such that the slidable member is in the closed position when adjacent the first position and disposed across both the first right panel and second right panel;

wherein the pivotable base panel is pivotably connected to a bottom of the front wall or a bottom of the rear wall, the pivotable base panel having a lower surface opposite an upper surface, the upper surface forming a bottom floor of the compartment;

wherein the pivotable base panel is configured to pivot between being disposed parallel to the front wall and rear wall for storage or being disposed perpendicular to the front wall and the rear wall when in use forming the bottom floor of the compartment; and wherein the right sidewall and the left sidewall are configured to fold inwardly into the compartment allowing the cart to collapse for storage.

2. The collapsible cart of claim 1, wherein the first right panel is coupled to the second right panel along a first vertical axis, and the first right panel is pivotably connected to the rear wall and the second right panel is pivotably connected to the front wall.

3. The collapsible cart of claim 2, wherein the first track extends across the first vertical axis, and wherein the first vertical axis is substantially closer to the first position on the second right panel than to the second position on the first right panel.

4. The collapsible cart of claim 3, wherein the left sidewall comprises a first left panel rotatably coupled to a second left panel along a second vertical axis, and further including a second track extending across the second vertical axis from a first position on the first left panel to a second position on the second left panel.

5. The collapsible cart of claim 3, further comprising a slidable member cooperatively engaged to the first track.

6. The collapsible cart of claim 1, further comprising a pair of three-wheel assemblies coupled to the bottom of the collapsible cart.

7. The collapsible cart of claim 6, wherein the three-wheel assemblies are coupled to the collapsible cart with a bolt and locking nut.

8. A collapsible cart configured to transition from a closed condition where it is folded up to an open condition where it is expanded for use, the collapsible cart having a rigid frame forming a compartment and comprising:

a front wall having a hole;
a rear wall;
a bottom wall;
a right sidewall configured to fold inwardly into the compartment and comprising a first right panel rotatably coupled to a second right panel, with a first track formed along the first right panel and the second right panel and extending from a first position on the second right panel to a second position on the first right panel, wherein the first track is formed to securely engage a first slidable member such that the first slidable member can slide along the first track between an open position to a closed position to selectively lock the first right panel to the second right panel, such that the first slidable member is in the open position when adjacent the second position and not disposed along the second right panel, and such that the first slidable member is in the closed position when adjacent the first position and disposed across both the first right panel and second right panel;
a left sidewall configured to fold inwardly into the compartment and comprising a first left panel rotatably coupled to a second left panel, with a second track formed along the first left panel and the second left panel and extending from a first position on the first left panel to a second position on the second left panel, wherein the second track is formed to securely engage a second slidable member such that the second slidable member can slide along the second track between an open position to a closed position to selectively lock the first left panel to the second left panel, such that the second slidable member is in the open position when adjacent the second position and not disposed along the first left panel, and such that the second slidable member is in the closed position when adjacent the first position and disposed across both the first left panel and second left panel; and
a lid adapted to be coupled to the front wall by hooking it to the hole in the front wall.

9. The collapsible cart of claim 8, wherein the first right panel is coupled to the second right panel along a first vertical axis, the first right panel is pivotably connected to the rear wall, and the second right panel is pivotably connected to the front wall, and wherein the first left panel is coupled to the second left panel along a second vertical axis, the first left panel is pivotably connected to the rear wall, and the second left panel is pivotably connected to the front wall.

10. The collapsible cart of claim 9, wherein the first track extends across the first vertical axis, with the first vertical axis being substantially closer to the first position on the second right panel than to the second position on the first right panel, and wherein the second track extends across the second vertical axis, with the second vertical axis being substantially closer to the first position on the first left panel than to the second position on the second left panel.

11. The collapsible cart of claim 10, further comprising a slidable member slidably secured to the first track, and a slidable member slidably secured to the second track.

12. The collapsible cart of claim 8, further comprising a plurality of rotatable swivel wheels connected to the cart having at least one wheel-locking assembly, the at least one wheel-locking assembly having a first condition for locking at least one of the rotatable swivel wheels to prevent rolling movement, and a second condition for unlocking the at least one of the rotatable swivel wheels.

13. The collapsible cart of claim 8, wherein the bottom wall comprises a bottom panel having a pivotal connection to the front wall or the rear wall.

14. The collapsible cart of claim 8, further comprising a pair of three-wheel assemblies coupled to the bottom of the collapsible cart.

15. A collapsible cart configured to transition from a closed condition where it is folded up to an open condition where it is expanded for use, the collapsible cart comprising a rigid frame forming a compartment and comprising:
a front wall having a hole;
a rear wall;
a bottom wall having a pivotable connection to another wall;
a left sidewall configured to fold inwardly into the compartment;
a right sidewall configured to fold inwardly into the compartment, and comprising a first right panel rotatably coupled to a second right panel;
a first track formed along the first right panel and the second right panel extending from a first position on the second right panel to a second position on the first right panel, the first track formed to cooperatively engage a slidable member;
a first slidable member securely engaged with the first track such that the first slidable member can slide along the first track between an unlocked condition when adjacent the second position and not disposed along the second right panel, and a locked condition when adjacent the first position and disposed across both the first right panel and second right panel, so as to allow selective locking and unlocking of the first right panel to the second right panel; and
a lid adapted to be coupled to the front wall by hooking it to the hole in the front wall.

16. The collapsible cart of claim 15, wherein the first right panel is coupled to the second right panel along a first vertical axis, the first right panel is pivotably connected to the rear wall, and the second right panel is pivotably connected to the front wall.

17. The collapsible cart of claim 16, wherein the first track extends across the first vertical axis, with the first vertical axis being substantially closer to the first position on the second right panel than to the second position on the first right panel.

18. The collapsible cart of claim 15, further comprising a plurality of rotatable swivel wheels connected to the cart having at least one wheel-locking assembly, the at least one wheel-locking assembly having a first condition for locking at least one of the rotatable swivel wheels to prevent rolling movement, and a second condition for unlocking the at least one of the rotatable swivel wheels.

19. The collapsible cart of claim 15, wherein the base panel is configured to pivot between being disposed parallel to the front wall and rear wall for storage or being disposed perpendicular to the front wall and the rear wall when in use forming the bottom floor of the compartment.

20. The collapsible cart of claim 15, further comprising a pair of three-wheel assemblies coupled to the bottom of the collapsible cart.

* * * * *